United States Patent [19]
Serrell et al.

[11] Patent Number: 5,004,896
[45] Date of Patent: Apr. 2, 1991

[54] OPTICAL DOCUMENT SCANNING AND MARK SENSING

[75] Inventors: Robert Serrell, Princeton; J. Lamar Smith, Hopewell, both of N.J.; Frederick L. Kurst, Centreville, Md.

[73] Assignee: Educational Testing Service, Princeton, N.J.

[21] Appl. No.: 385,382

[22] Filed: Jul. 26, 1989

[51] Int. Cl.$^5$ ............... G06K 5/00; G06K 7/10
[52] U.S. Cl. ................... 235/437; 235/436; 235/456
[58] Field of Search ............ 235/436, 437, 454, 456; 382/47

[56] References Cited

U.S. PATENT DOCUMENTS

| | | | |
|---|---|---|---|
| 3,201,569 | 8/1965 | Conron | 235/61.7 |
| 3,230,350 | 1/1966 | Mendelson et al. | 235/61.11 |
| 3,264,610 | 8/1966 | Rabinow | 340/146.3 |
| 3,372,494 | 3/1968 | Marcus | 35/48 |
| 3,444,517 | 5/1969 | Rabinow, Jr. | 340/146.3 |
| 3,611,593 | 10/1971 | Shapiro | 35/35 |
| 3,793,472 | 2/1974 | Sternberg et al. | 35/48 A |
| 3,860,790 | 1/1975 | Reckdahl | 235/61.11 |
| 3,896,295 | 7/1975 | LaPlante | 235/61.12 |
| 3,943,642 | 3/1976 | Sokolski | 35/48 |
| 3,983,364 | 9/1976 | Ridgehammer | 235/454 X |
| 3,995,381 | 12/1976 | Manfred et al. | 35/48 |
| 4,009,467 | 2/1977 | Kodera | 235/436 X |
| 4,021,777 | 5/1977 | Shepard | 340/146.3 |
| 4,112,595 | 9/1978 | Fernandez et al. | 35/35 E |
| 4,153,895 | 5/1979 | Weisbrod et al. | 340/146.3 |
| 4,162,408 | 7/1979 | Hansen | 250/555 |
| 4,200,888 | 4/1980 | Blom | 358/162 |
| 4,243,876 | 1/1981 | Engel et al. | 235/455 |
| 4,287,564 | 9/1981 | Swift et al. | 364/525 |
| 4,298,859 | 11/1981 | Feilchenfeld | 340/146.3 |
| 4,300,123 | 11/1981 | McMillin et al. | 340/146.3 |
| 4,479,194 | 10/1984 | Fogg et al. | 364/900 |

OTHER PUBLICATIONS

Datasheet entitled, "Industrial Line Scan Cameras", Fairchild Camera and Instrument Corporation, Nov., 1980.

Primary Examiner—Harold Pitts
Attorney, Agent, or Firm—Woodcock Washburn Kurtz Mackiewicz & Norris

[57] ABSTRACT

A method for optically scanning a document having preprinted marking positions is disclosed. According to the invention, the document has a specified format including rows of preprinted marking positions to be scanned. Document size in at least one direction is automatically measured at each row of preprinted marking materials before that row is scanned. The scanning of each row of preprinted marking positions is automatically adjusted to compensate for random variations in shrinkage and expansion of document size. Document skew relative to the scanning camera is automatically measured at each row of preprinted marking positions to be scanned before scanning each row, and an indication that scanning should not continue is provided if any skew measurement exceeds a predetermined skew limit.

10 Claims, 21 Drawing Sheets

UNSCANNED AREA

OVERSCANNED AREA

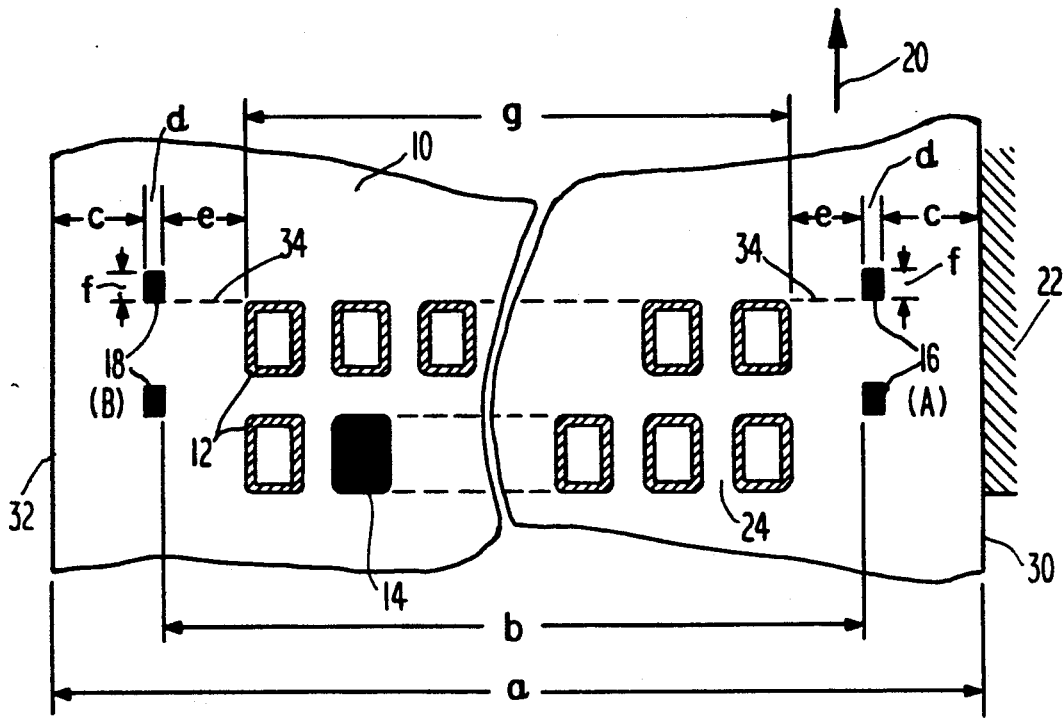
Fig. 4
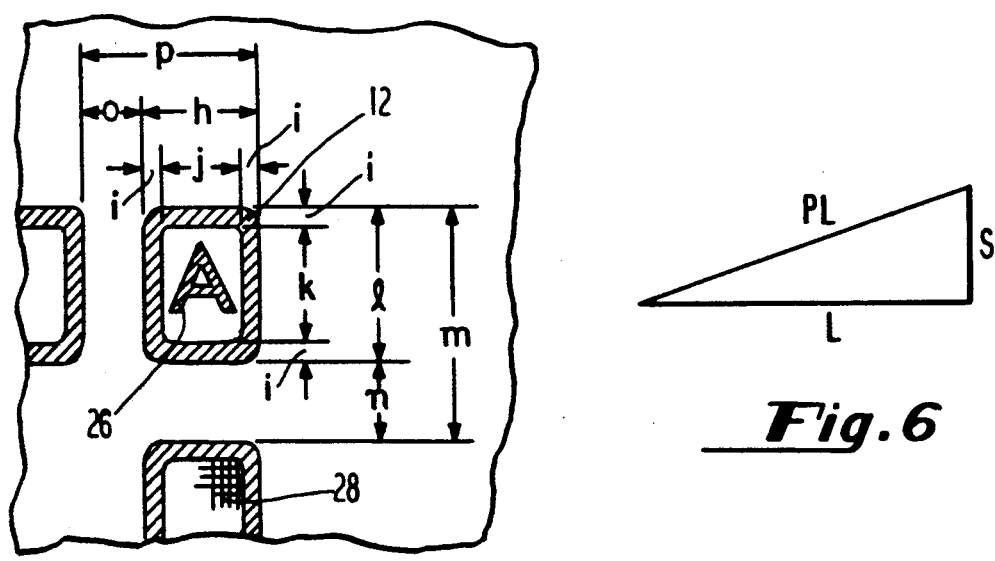
Fig. 5
Fig. 6

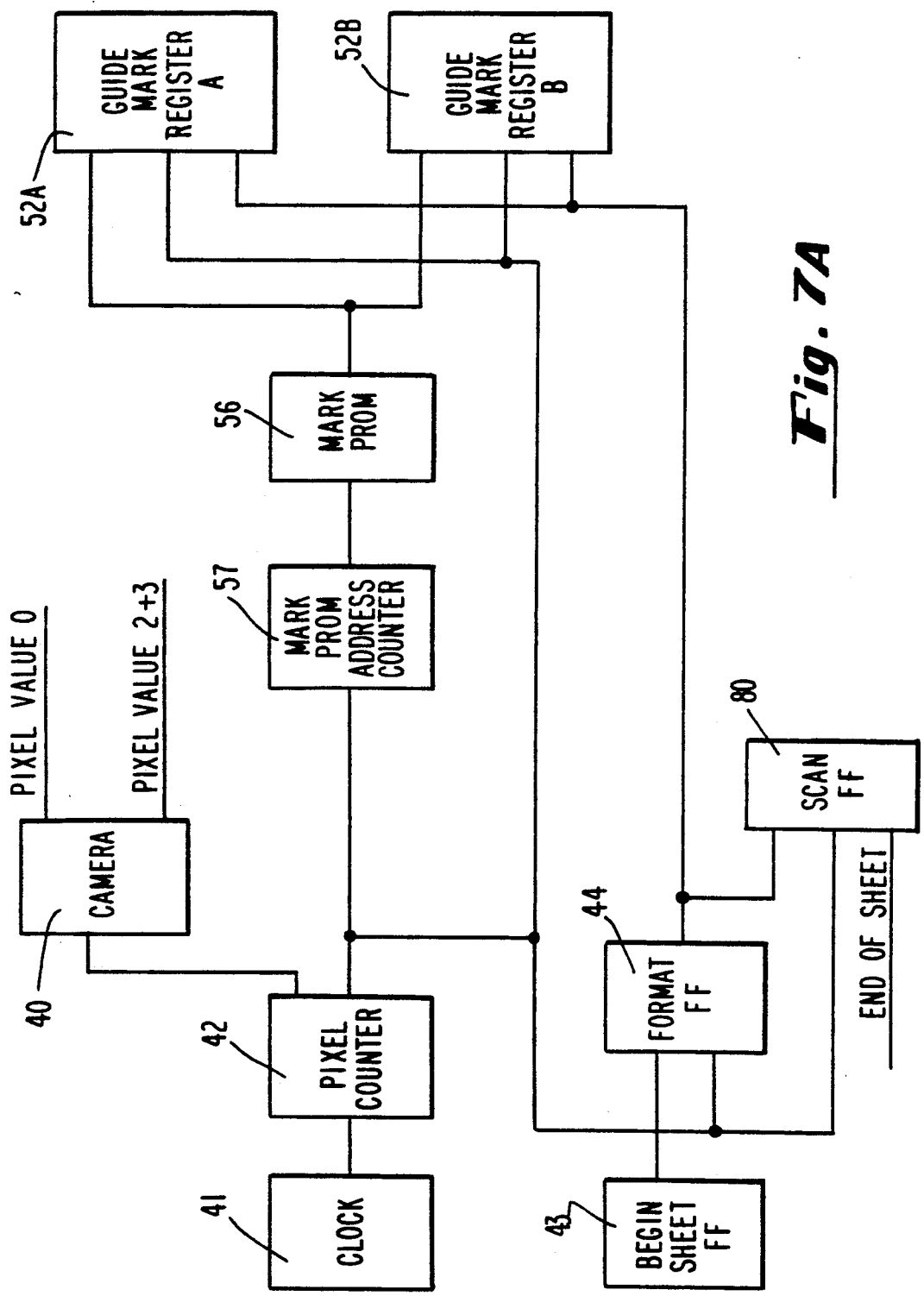

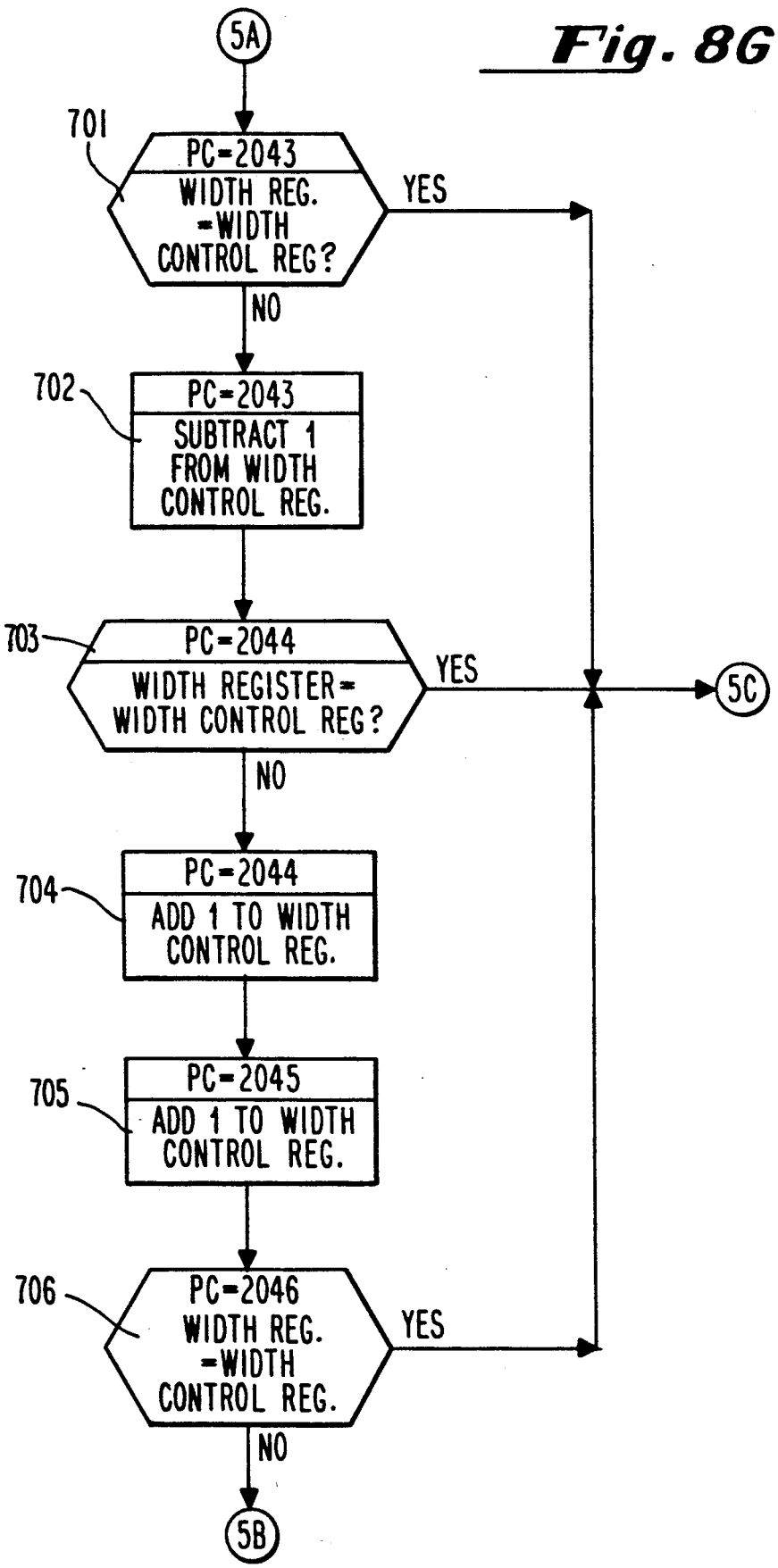

WIDTH CORRECTION FROM: ADDRESSES AND CONTENTS

| ADDRESS (8)* | INDIRECT ADDRESS (8) |
|---|---|
| 0 | 0 |
| 1 | 20 |
| 2 | 22 |
| 3 | 26 |
| 4 | 34 |
| 5 | 44 |
| 6 | 56 |
| 7 | 72 |
| 10 | 110 |
| 11 | 130 |
| 12 | 152 |
| 13 | 176 |
| 14 | 224 |
| 15 | 254 |
| 16 | 306 |
| 17 | 342 |

\* (8) Means that octal notation is used.

*Fig. 9A*

WIDTH CORRECTION PROM

| MPAC | WORD 1 | WORD 2(B)* | WIDTH CORRECTION PROM ADDR(8)* |
|---|---|---|---|
| WR= 0 | | | |
| WR= 1 | | | |
| 938 | 3 | 252 | 20 |
| WR= 2 | | | |
| 644 | 2 | 204 | 22 |
| 1232 | 4 | 320 | 24 |
| WR= 3 | | | |
| 498 | 1 | 362 | 26 |
| 938 | 3 | 252 | 30 |
| 1379 | 5 | 143 | 32 |
| WR= 4 | | | |
| 409 | 1 | 231 | 34 |
| 762 | 2 | 372 | 36 |
| 1114 | 4 | 132 | 40 |
| 1467 | 5 | 273 | 42 |
| WR= 5 | | | |
| 351 | 1 | 137 | 44 |
| 644 | 2 | 204 | 46 |
| 938 | 3 | 252 | 50 |
| 1232 | 4 | 320 | 52 |
| 1525 | 5 | 365 | 54 |
| WR= 6 | | | |
| 309 | 1 | 65 | 56 |
| 560 | 2 | 60 | 60 |
| 812 | 3 | 54 | 62 |
| 1064 | 4 | 50 | 64 |
| 1316 | 5 | 44 | 66 |
| 1567 | 6 | 37 | 70 |
| WR= 7 | | | |
| 277 | 1 | 25 | 72 |
| 498 | 1 | 362 | 74 |
| 718 | 2 | 316 | 76 |
| 938 | 3 | 252 | 100 |
| 1158 | 4 | 206 | 102 |
| 1379 | 5 | 143 | 104 |
| 1599 | 6 | 77 | 106 |

\* (8) MEANS OCTAL NOTATION
WR = WIDTH REGISTER VALUE

Fig. 9B

WIDTH CORRECTION PROM

| MPAC | WORD 1 | WORD 2(B)* | WIDTH CORRECTION PROM ADDR(8)* |
|---|---|---|---|
| WR= 8 | | | |
| 253 | 0 | 375 | 110 |
| 449 | 1 | 301 | 112 |
| 644 | 2 | 204 | 114 |
| 840 | 3 | 110 | 116 |
| 1036 | 4 | 14 | 120 |
| 1232 | 4 | 320 | 122 |
| 1427 | 5 | 223 | 124 |
| 1623 | 6 | 127 | 126 |
| WR= 9 | | | |
| 233 | 0 | 351 | 130 |
| 409 | 1 | 231 | 132 |
| 586 | 2 | 112 | 134 |
| 762 | 2 | 372 | 136 |
| 938 | 3 | 252 | 140 |
| 1114 | 4 | 132 | 142 |
| 1290 | 5 | 12 | 144 |
| 1467 | 5 | 273 | 146 |
| 1643 | 6 | 153 | 150 |
| WR= 10 | | | |
| 217 | 0 | 331 | 152 |
| 377 | 1 | 171 | 154 |
| 538 | 2 | 32 | 156 |
| 698 | 2 | 272 | 160 |
| 858 | 3 | 132 | 162 |
| 1018 | 3 | 372 | 164 |
| 1178 | 4 | 232 | 166 |
| 1338 | 5 | 72 | 170 |
| 1499 | 5 | 333 | 172 |
| 1659 | 6 | 173 | 174 |
| WR= 11 | | | |
| 204 | 0 | 314 | 176 |
| 351 | 1 | 137 | 200 |
| 498 | 1 | 362 | 202 |
| 644 | 2 | 204 | 204 |
| 791 | 3 | 27 | 206 |
| 938 | 3 | 252 | 210 |
| 1085 | 4 | 75 | 212 |
| 1232 | 4 | 320 | 214 |
| 1379 | 5 | 143 | 216 |
| 1525 | 5 | 365 | 220 |
| 1672 | 6 | 210 | 222 |

* (8) MEANS OCTAL NOTATION

*Fig. 9C*

WIDTH CORRECTION PROM

| MPAC | WORD 1 | WORD 2(B)* | WIDTH CORRECTION PROM ADDR(8)* |
|---|---|---|---|
| WR= 12 | | | |
| 193 | 0 | 301 | 224 |
| 328 | 1 | 110 | 226 |
| 464 | 1 | 320 | 230 |
| 599 | 2 | 127 | 232 |
| 735 | 2 | 337 | 234 |
| 870 | 3 | 146 | 236 |
| 1006 | 3 | 356 | 240 |
| 1141 | 4 | 165 | 242 |
| 1277 | 4 | 375 | 244 |
| 1412 | 5 | 204 | 246 |
| 1548 | 6 | 14 | 250 |
| 1683 | 6 | 223 | 252 |
| WR= 13 | | | |
| 183 | 0 | 267 | 254 |
| 309 | 1 | 65 | 256 |
| 435 | 1 | 263 | 260 |
| 560 | 2 | 60 | 262 |
| 686 | 2 | 256 | 264 |
| 812 | 3 | 54 | 266 |
| 938 | 3 | 252 | 270 |
| 1064 | 4 | 50 | 272 |
| 1190 | 4 | 246 | 274 |
| 1316 | 5 | 44 | 276 |
| 1441 | 5 | 241 | 300 |
| 1567 | 6 | 37 | 302 |
| 1693 | 6 | 235 | 304 |

\* (8) MEANS OCTAL NOTATION

*Fig. 9D*

WIDTH CORRECTION PROM

| MPAC | WORD 1 | WORD 2(B)* | WIDTH CORRECTION PROM ADDR(8)* |
|---|---|---|---|
| WR= 14 | | | |
| 174 | 0 | 256 | 306 |
| 292 | 1 | 44 | 310 |
| 409 | 1 | 231 | 312 |
| 527 | 2 | 17 | 314 |
| 644 | 2 | 204 | 316 |
| 762 | 2 | 372 | 320 |
| 879 | 3 | 157 | 322 |
| 997 | 3 | 345 | 324 |
| 1114 | 4 | 132 | 326 |
| 1232 | 4 | 320 | 330 |
| 1349 | 5 | 105 | 332 |
| 1467 | 5 | 273 | 334 |
| 1584 | 6 | 60 | 336 |
| 1702 | 6 | 246 | 340 |
| WR= 15 | | | |
| 167 | 0 | 247 | 342 |
| 277 | 1 | 25 | 344 |
| 387 | 1 | 203 | 346 |
| 498 | 1 | 362 | 350 |
| 608 | 2 | 140 | 352 |
| 718 | 2 | 316 | 354 |
| 828 | 3 | 74 | 356 |
| 938 | 3 | 252 | 360 |
| 1048 | 4 | 30 | 362 |
| 1158 | 4 | 206 | 364 |
| 1268 | 4 | 364 | 366 |
| 1379 | 5 | 143 | 370 |
| 1489 | 5 | 321 | 372 |
| 1599 | 6 | 77 | 374 |
| 1709 | 6 | 255 | 376 |

* (8) MEANS OCTAL NOTATION

*Fig. 9E*

OPTICAL DOCUMENT SCANNING AND MARK SENSING

INCORPORATION BY REFERENCE

The disclosure of U.S. Pat. No. 4,300,123 to McMillin et al. is incorporated herein by reference in its entirety.

FIELD OF THE INVENTION

The present invention relates to the field of optical document scanning and mark sensing. The present invention has particular application to optical scanning and mark sensing of documents of the type having an array of preprinted marking positions for recording, for example, by pencil markings, responses to multiple choice questions, but is not limited thereto.

BACKGROUND OF THE INVENTION

Optical document scanners for reading, by mark sensing, data recorded on a document are well-known. Typically, such scanners comprise a camera containing a linear array of photosensitive elements coupled to a signal processor associated with the scanner. The camera electronically scans marks made on the documents, usually pencil marks, by receiving light reflected from the document when it is illuminated. Typically, the pencil marks represent responses to multiple choice questions or other information. The photosensitive elements of the camera define pixels and provide electrical signals which represent the placement of the marks on the document. These signals are supplied to the signal processor.

The aforementioned type of documents generally contain marking positions lightly preprinted thereon for recording the responses (pencil marks). The marking positions may take one or more of a variety of formats (e.g., circular or elliptical) and are usually aligned in rows parallel to the width of the document. Each document is transported through the scanner in a direction perpendicular to the rows so that each row is successively indexed through a scanning location. At the scanning location, a light source illuminates the entire row so that the data, i.e., the placement of the pencil marks, can be read by the camera. A guide within the scanner maintains document registration as it is transported therethrough. Timing or guide marks are generally printed along a longitudinal edge of the document to signal to the camera the arrival of each row of marking positions at the scanning location. FIG. 1 illustrates a typical prior art scanner of the aforementioned type. As illustrated, such scanner comprises a camera 1 coupled to a signal processor 9, a light source 2 and a guide 3. Document 4 has a plurality of marking positions 5 for placement of pencil marks 6. The document 4 also has timing marks 7 and is transported in the direction indicated by the arrow 8.

The prior art is typified by U.S. Pat. No. 4,300,123 ("the '123 patent"), which has been commercially embodied as the Model W-201 scanner by Westinghouse Electric Company. This machine is for particular use with documents having an array of preprinted elliptically shaped marking positions for recording information by pencil marks. The Westinghouse machine also employs a Fairchild Company Charge Coupled Device ("CCD") Model 1310 electronic camera having a plurality of square photosensitive elements. It will be apparent that, since the photosensitive elements are square and the marking positions are elliptical, no side of any marking position can be precisely aligned with any photosensitive element during scanning. Precise scanning and accurate reading of the recorded data can, therefore, be problematic.

The prior art is also typified by the Model NCS 22-85 optical document scanner manufactured by National Computer Systems. This machine has particular application to documents having an array of circularly shaped marking positions. This format is acceptable if the scanner reading the document employs individual phototransistors. However, if the scanner employs a camera having square photosensitive elements, such as the Fairchild 1310 camera, this format is inadequate for precise scanning for the same reasons as discussed above. These limitations of the prior art are discussed in more detail below.

Another limitation of the prior art is the inability to automatically adjust for lateral displacement of the document while it is transported through the scanner. The above-described model NC-22-85 machine does not provide any means for automatically correcting for lateral displacement of the document. The above-described described '123 patent, however, does describe a means for automatically adjusting the scan to correct for minor lateral displacement of the document. According to the '123 patent, it is said that lateral displacement is measured in terms of pixel counts which indicate the actual transverse location of the document with respect to the array of photosensitive elements in the camera. But, these pixel counts correspond to only one edge of the document, and do not and cannot provide an indication of variations in the width of the document. This is a problem inasmuch as actual document width can vary for a number of reasons.

Thus, there are two serious limitations of prior art scanners: (1) imprecise registration of a raster generate square photosensitive elements of the camera with circular or elliptical marking positions; and, (2) uncompensated hygrometric and other variations in the width of documents scanned. These and other limitations of the prior art are addressed by the present invention. A greater appreciation of the instant invention will be realized, however, by a more detailed analysis of the problems of prior art scanners.

Underscanning or overscanning of marking positions unavoidably results when using a commercially available camera to scan the above-described documents having circular or elliptical marking positions. It is not possible to scan an entire marking position without also scanning some of the white background of the document because the elements of the photosensitive array are square. Either part of the marking position will not be scanned (underscanning), or part of the white background of the document around the marking position will be scanned (overscanning). Both results are undesirable. In both underscanning and overscanning of a marking position, the sum of the intensity values of the camera's exposed photosensitive elements does not represent the true intensity of the light reflected by the pencil marks. The discrepancies between the true intensities and the intensities perceived by the camera are often great enough to seriously impair the discrimination of faint, albeit intended, marks as compared to dark erasures.

The foregoing is made evident by the following. In the case of underscanning, the proportion of the area of a circular marking position left unscanned by the largest possible square raster within the marking position (see FIG. 2) is:

$$(\pi R^2 - 2R^2)/\pi R^2 = 1 - 2/\pi = 0.36$$

where R=radius of circular marking position.

Thus, in the case of underscanning, the minimum unscanned area of a circular marking position by a square photosensitive element is 36% of the total surface area. In the case of overscanning, the proportion of the area of a circular marking position which is overscanned (on the white background of the document) by the smallest possible square raster which just encloses the marking position (see FIG. 3) is:

$$(4R^2 - \pi R^2)/\pi R^2 = 4/\pi - 1 = 0.27$$

where R=radius of circular marking position.

Thus, in the case of overscanning, 27% additional area is scanned relative to the area enclosed by the circular marking position.

Both of the above-described Model W-201 and Model NCS 2285 machines are for use with so-called "long-grain" paper documents, i.e., the fibers of the paper are essentially parallel to the long dimension of the document. The documents for these scanners typically measure 8½ by 11 inches and are generally transported in a direction parallel to their long dimension. Long-grain orientation is used to impart greater stiffness to the paper in the direction in which the sheets are transported under the scanning head. The greater stiffness decreases the likelihood of paper jams in the transport mechanism of the scanner. A problem with long-grain orientation of the paper fibers, however, is that it increases the vulnerability of the sheets to hygrometric variations in their width. The humidity content affects the size of a sheet of paper mostly in the direction perpendicular to the fibers, i.e., width variations may occur. In extreme cases the width of an 8½" by 11" document may shrink or expand by as much as 0.04". It will be appreciated variations in width may impair the registration of the marking positions relative to the "electronic mask" or scanning windows in the scanner designed to correlate the photosensitive elements to the marking positions for the camera. This phenomenon is described in the aforementioned '123 patent. In extreme, but not uncommon, cases of this impairment, misregistration renders accurate scanning of high density marking positions virtually impossible. No common humidity treatment can be applied to the documents at the time of scanning to correct for width discrepancies because different batches of answer sheets are unavoidably subjected to different histories of humidity conditions.

Another important limitation of prior art scanners is that their cameras do not provide sufficient detail for effective pictorial scanning. The aforementioned Fairchild Model 1310 camera has only 1024 photosensitive elements. For an eight-inch scanning line, this provides only 1024/(8×72)=1.77 pixels per printer's point. (As is known, the standard of measure is 72 printer's points per inch.) This is little more than half the detail of the three pixels per printer's point of the commonly accepted facsimile standard.

In view of the foregoing limitations of the prior art, it will be appreciated that it is desirable to provide a scanning and mark sensing method and apparatus that: (1) provides proper registration of the marking positions with respect to the array of photosensitive elements of the camera; and, (2) compensates, automatically, for hygrometric and other variations in the width of documents as they pass through the scanning location. The instant invention achieves these and other goals.

SUMMARY OF THE INVENTION

The present invention represents an improvement in optical scanners of the type disclosed in the aforementioned '123 patent, and except as noted herein, its teachings are applicable hereto.

It is an object of the present invention to provide an optical document scanner, and a document having preprinted marking positions thereon for use with such scanner, which will prevent misregistration and coverage inadequacies of the circular and elliptical marking positions of the prior art. According to one aspect of the invention, this is achieved by providing a document having rectangular (including square) marking positions that can be covered and perceived accurately, within one pixel, by square or rectangular photosensitive elements in the camera.

It is another object of the invention to provide an optical document scanner, and document for use therewith, that permits the use of long-grain paper for the documents while avoiding the consequences of width variations associated with such paper. According to one aspect of the present invention, this is achieved by providing electronic means for automatically adjusting the location of the "electronic mask" or scanning windows of the camera to compensate for transverse shrinkage (or expansion) of the paper, and to compensate for transverse inaccuracies in the printing of the marking positions on the document, such as trapezoidal distortion.

It is yet another object of the invention to provide an optical document scanner that permits accurate and efficient use of documents conforming to accepted printing standards, and permits a more efficient use of the space available on such documents. According to one aspect of the present invention, this is achieved by providing a document that uses exclusively the standard "printer's points" measure in the layout of the marking positions on the document, as well as for the layout of other preprinted material on the document such as control marks, guide marks, symbols, etc. Achievement of this object facilitates composition of such documents in all varieties using common printing machinery.

It is still a further object of the present invention to provide an optical document scanner that will ensure the proper and consistent alignment of printed material on the document with the pixel defining photosensitive elements of the scanner's camera. According to one aspect of the invention, this is achieved by use of a facsimile standard three pixels per printer's point imaging technique. The utilization of common facsimile standards in scanning permits efficient processing of relevant information on documents, such as pictorial information and signatures, as well as processing of pencil marks in marking positions on the document. Use of common facsimile standards also renders possible recognition of standard or handwritten characters, as well as the sensing of marks, without modification of the optical scanning equipment and camera circuitry.

According to the invention, a method of optically scanning a document having rows of material to be scanned comprises first transporting the document to be scanned beneath the camera. The document typically has generally parallel sides, and the camera scans the document along a direction substantially parallel to one of the sides. Document skew relative to the camera is automatically measured at each row to be scanned before scanning each row of material. An indication is provided that scanning should not continue if any skew measurement exceeds a predetermined skew limit. A measure of document size in at least a direction parallel to the direction of scanning is automatically provided at each row of material to be scanned, also before scanning each row of material. The scanning of each row of material is automatically adjusted to compensate for random variations in document size.

According to a preferred embodiment of the invention, the document is generally rectangular and has a plurality of rows of generally rectangularly shaped, preprinted marking positions for recording information by means of pencil marks. The document also has a plurality of pairs of first and second guide marks, wherein each pair of guide marks is associated with a row. A first guide mark of each pair is adjacent to one end of each row and a corresponding second guide mark of each pair is adjacent to the other end of each row. Each guide mark has a trailing edge. The marking positions and guide marks have sides that are generally parallel to the sides of the document, and each marking position, guide mark and spaces therebetween is an integral number of printer's points. Preferably, there are three pixels per printer's point so that an integral number of pixels substantially completely and exactly fill each marking position.

According to a preferred practice of the invention, an addressable memory has stored data defining scanning windows of the camera as a function of pixel counts and receives addresses from an address counter clocked by a pixel pulse stream. According to the method described above, the document is scanned along scan lines so that guide marks and pencil marks in the marking positions can be detected. Preferably, there are a plurality of scan lines between each pair of guide marks and the scan lines extend between at least the trailing edges of each pair of guide marks. The number of scan lines along which scanning occurs after the first detection of a guide mark is counted, and the count is compared to a predetermined scan line count. An indication that the document should not undergo continued scanning is provided if, before the next detection of a guide mark, the number of scan lines counted exceeds the predetermined scan line count. Otherwise, the number of pixels between the trailing edges of a pair of guide marks is counted, along a scan line, to obtain a first measure of width. Then, the number of pixels between the trailing edges of the same pair of guide marks along another scan line is counted to obtain a second measure of width. The first and second measures of width are compared, and a subsequent measure of width along a subsequent scan line between the same pair of guide marks is performed if the first and second measures of width are not within a predetermined pixel count of each other. The subsequent measure of width is then compared to a preceeding measure of width. An indication that the document should not undergo continued scanning is provided if the subsequent measure of width and the preceding measure of width are not within the predetermined pixel count of each other. If the subsequent measure and preceding measure of width are within the predetermined pixel count of each other, then scanning of the row of marking positions is automatically adjusted to compensate for variation in document width. This is performed by periodically suppressing, according to a selected measure of width, a pulse in the pulse stream to alter the address supplied to the memory. The scanning windows are initially defined as though the document is shrunk in width by a predetermined amount, and the suppression of pulses from the pulse stream effectively redefines the scanning windows to correspond to the selected measure of width of the document. Thus, the photosensitive elements are effectively correlated with the actual locations of the marking positions. Thereafter, actual scanning of the marking positions is performed.

BRIEF DESCRIPTION OF THE DRAWINGS

FIG. 4 is a top plan view of a section of a document having marking positions according to the present invention.

FIG. 5 is a detail view of the marking positions provided according to the present invention.

FIG. 6 is a diagram of a simple triangle provided for the purpose of illustrating the concept of document skew.

FIGS. 7A through 7E are a block diagram of the preferred embodiment of the circuitry used in connection with the practice of the present invention.

FIGS. 8A through 8H are a flowchart illustrating the logical operations performed by the circuitry of FIGS. 7A through 7E.

FIGS. 9A through 9E illustrate addresses and contents for a width PROM used in connection with the practice of the preferred embodiment of the invention.

DETAILED DESCRIPTION OF THE PREFERRED EMBODIMENT

The present invention is described herein in connection with the processing of test answer sheets of the type having an array of marking positions for recording the responses to multiple choice questions by application of pencil marks. However, it should be understood that this is merely the preferred embodiment of the invention, and that the invention is equally applicable to optical scanning of other types of documents. For example, the present invention is fully applicable to optical scanning of pictorial data, in symbolic or other forms, and to documents carrying forms of data other than marks.

Figure 1:
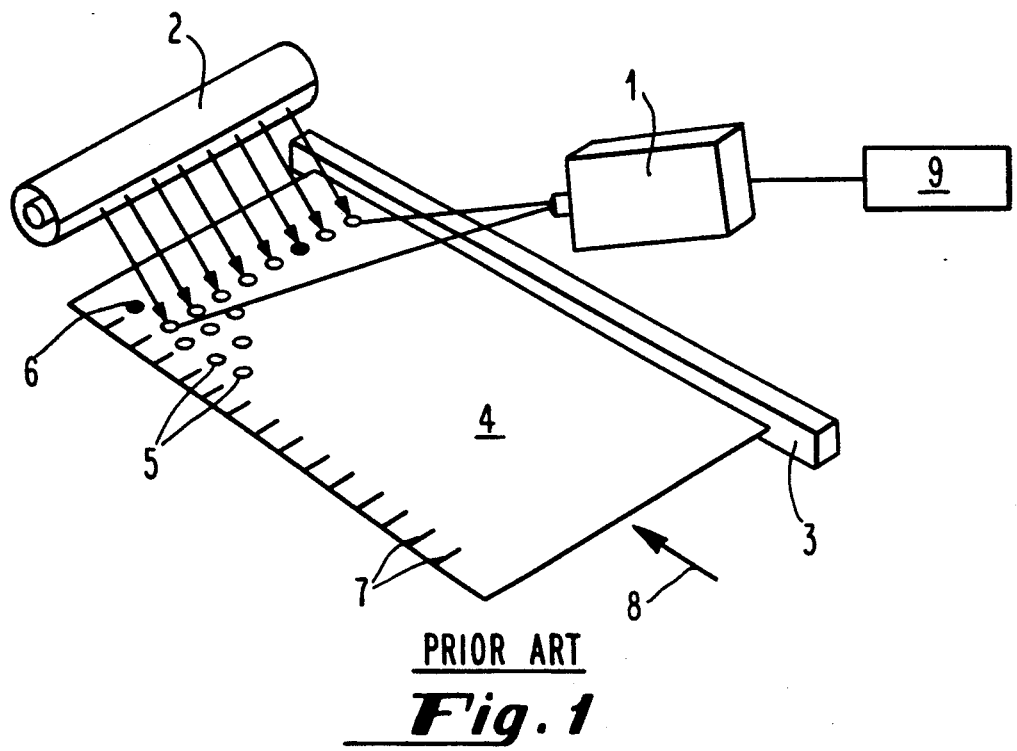
FIG. 1 is a simplified diagrammatical illustration of a prior art optical scanner.
Figure 2:
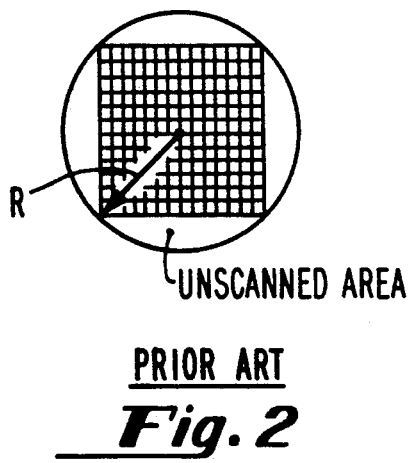
FIG. 2 diagrammatically illustrates the problem of underscanning in prior art optical scanners.
Figure 3:
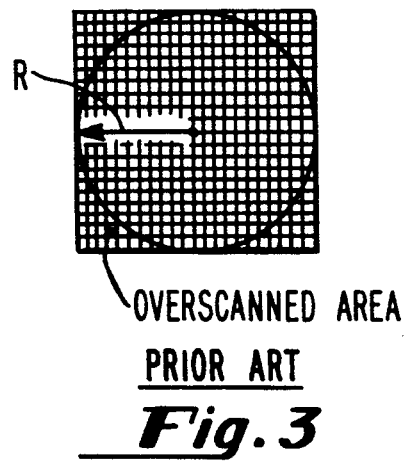
FIG. 3 diagrammatically illustrates of the problem of overscanning in prior art optical scanners.

The preferred embodiment of the invention is described herein in three parts. The first part describes a preferred document design, in the form of a test answer sheet, for use with the optical scanner of the present invention. The second part describes preferred optical scanner equipment and circuitry for performing automatic adjustment of transverse registration and of scanning windows (i.e., the camera's "electronic mask") to accommodate random width variations in the document. The third part describes a detailed logic flow diagram of the circuitry and operations involved therewith. The basic configuration of the optical scanner and document of the present invention is as shown in FIG. 1 with the modifications noted herein.

Part I: Document Design

Referring to FIG. 4, there is illustrated a portion of a document 10 according to the present invention. Document 10 is a variant of the document 4 illustrated in FIG. 1, but has many important distinguishing features. As illustrated, document 10 comprises a plurality of preprinted marking positions 12 arranged in sequential rows. Preferably, there are 64 marking positions 12 per row. One of the marking positions is shown as having been penciled in at 14 to record, for example, a response to a multiple choice question. Typically, document 10 will be an 8½" by 11" rectangular sheet of paper having a top edge which is first scanned by the optical scanner, a bottom edge which is last scanned by the optical scanner and right and left sides 30, 32, respectively. Preferably, the rows of marking positions 12 are parallel to the top and bottom edges of the document 10. Additionally, the marking positions 12 are preferably symmetrically spaced, although a document having asymmetrically spaced marking positions may be used with the optical scanner of the present invention. As also illustrated, guide marks 16 are printed along the right side 30 of the document 10 and guide marks 18 are printed along the left side 32 of the document 10. Preferably, the guide marks 16 (also referred to herein as guide marks "A") are symmetrically spaced along the longitudinal direction of the document 10. Similarly, the guide marks 18 (also referred to herein as guide marks "B") are preferably symmetrically spaced along the longitudinal direction of the document 10. As shown, there is a pair of guide marks associated with each row. A guide mark 16 of each pair is associated with the right end of each row of marking positions 12, and a guide mark 16 of each pair is associated with the left end of each row.

Document 10 is transported by well-known transportation means, not shown, in the direction of the arrow 20, so as to index each row of marking positions 12 through a scanning location at which the camera's photosensitive elements can scan the document by well-known means. The right edge 30 of the document 10 slides along a guide 22 to maintain document alignment. It will be appreciated that the bottom edge of each pair of guide marks 16, 18 is aligned with the top edge of a respective row of marking positions 12, as indicated by the dotted lines 34. As will become evident hereinafter, when the document is scanned from right to left at the scanning location, the left edge of each guide mark 16, 18 represents a "trailing edge" to the photosensitive elements by which they are scanned.

A number of significant dimensions of the document thus described are set forth below. The dimensions are indicated on FIG. 4 as a through g.

| REFERENCE LETTER | DESCRIPTION | DIMENSION (Points) |
|---|---|---|
| a | width of document | 612 |
| b | distance between the innermost edges of a pair of guide marks 16, 18 | 588 |
| c | distance between the outermost edge of each guide mark 16 and the right-hand edge 30 of the document 10, and the distance between the outermost edge of each guide mark 18 and the left-hand edge 32 of the document 10 | 10 |
| d | width of guide marks 16, 18 | 2 |
| e | distance between the innermost edge of each guide mark 16 and the right-hand edge of the rows of marking positions 12 | 7 |
| e' | distance between the innermost edge of each guide mark 18 and the left-hand edge of the rows of marking positions 12 | 8 |
| f | length of guide mark | 3 |
| g | length of each row of marking positions 12 (outermost edge to outermost edge) | 573 |

Preferably, the document is formatted so as to have 64 symmetrically spaced marking positions per row, with a space between adjacent marking positions in a row, as shown at 24.

Referring to FIG. 5, details of the marking positions 12 will be provided. Note that the marking position 12 of FIG. 5 is illustrated as having the letter "A" lightly printed therein indicating the choice of answer "A" to a multiple choice question. FIG. 5 illustrates a number of significant dimensions h through p relating to the marking positions. These are set forth below.

| REFERENCE LETTER | DESCRIPTION | DIMENSION (Points) |
|---|---|---|
| h | outside width of a marking position 12 | 6 |
| i | width of border defining each marking position 12 | 1 |
| j | inner width of each marking position | 4 |
| k | inner length of each marking position | 6 |
| l | outer length of each marking position | 8 |
| m | distance between the top (or bottom) of each row of marking positions | 12 |
| n | distance separating each row of marking positions | 4 |
| o | distance separating the outermost edges of adjacent marking positions in a row | 3 |
| p | distance between corresponding edges of adjacent marking positions in a row | 9 |

As shown, each of the marking positions 12 is preferably rectangular (including square) in shape for reasons previously described and which will become more apparent hereinafter. Also, as shown, sides of the guide marks 16, 18 and of the marking positions 12 are parallel to the sides of document 10. Those skilled in the art will appreciate that the dimensions separating the rectangular marking positions 12 provided above define high-density marking positions, i.e., 8 per inch. Not shown are alternative low-density, square marking positions (6 per inch) which, if provided, would measure 8 points square (outside) and would be placed 12 points apart, both within and between rows. Forty-eight low-density marking positions can be printed in the same space as the 64 high-density marking positions of FIGS. 4 and 5. Those skilled in the art will also appreciate that, irrespective of whether high-density or low-density marking positions are used, standard square pixels of the camera measuring ⅓ point each will completely and exactly fill the interior of a marking position 12, as shown at 28 of FIG. 5. In other words, the marking positions 12, guide marks 16, 18 and spaces 24 are sized so that each is an integral number of printer's points, and so that there is an integral number of pixels per printer's point with a ratio selected so that an integral number of pixels of the camera substantially completely and exactly fill each marking position 12.

The document 10 of FIG. 4 is illustrated with its rows of marking positions 12 placed symmetrically with respect to the longitudinal edges of 30, 32 of the document 10. However, symmetry is not necessary. The rows of marking positions can be placed asymmetrically to provide for a 65th position if desired, or to provide for a control channel.

As mentioned, a pair of guide marks 16, 18 is associated with each row of marking positions. See FIG. 4. The guide marks 16, 18 associated with a row are printed in the locations set forth above so that they will be scanned first, before the associated row of marking positions is scanned, as the document moves through the scanning location. The guide marks 16, 18 perform three functions:

First, the guide marks 16 (or "A") on the right-hand side of the document 10 provide a registration reference for each scan. It can be assumed that the displacement of the guide marks 16 due to lateral document shrinkage or expansion, relative to the camera's photosensitive elements, is negligible, since these guide marks are close to the guide 22. Thus, the trailing edge of guide marks 16 provides a scanning reference, i.e., a starting point for scanning, independent of random width variations of the document 10. Assuming that scanning of the document proceeds from right to left, it will be appreciated that the trailing edge of each guide mark 16 is 10+2=12 points from the guide 22.

Second, the guide marks 16, 18 provide an indication of document skew. Thus, if the document 10 is not skewed, the two guide marks 16, 18 associated with each row will be sensed essentially simultaneously. However, if the document is skewed, one or the other of the guide marks 16, 18 will be sensed first. The number of scans performed between the sensing of the first and second guide marks is a measure of the amount of skew. Each square pixel in the camera measures ⅓ point, so each adjacent scan performed after sensing one of the guide marks, but before sensing both, corresponds to a skew of ⅓ point (approximately 0.004629") at one edge of the document relative to the other.

Third, the distance between the trailing edges of a pair of guide marks 16, 18, provides a direct measure, in pixels, of the actual width of the document at the associated row. For a document of exactly the nominal width, this distance is 588+2=590 points or 590×3=1770 pixels.

Part II: Optical Scanner Equipment and Design

As mentioned, the basic configuration of the optical scanner equipment of the present invention is as illustrated in FIG. 1 and as described in the aforementioned '123 patent, but with the improvements and modifications noted herein. Thus, the optical scanner of the present invention utilizes a line scan camera and a "mark programmable read only memory" (MPROM) to define "scanning windows", i.e., correlate the photosensitive elements of the camera to the marking position areas on the document to be scanned by the camera, as a function of pixel counts. However, it is preferred that in the practice of the present invention, a camera such as the Fairchild Company CCD Model 1500R be used instead of the Fairchild Model 1310 described in the '123 patent. The Fairchild Model 1500R contains 2048 photosensitive elements, as compared to the 1024 elements of the Model 1310 camera, and thus provides the additional detail necessary for precise registration between the scanning positions on the document and the photosensitive elements of the camera, and also provides for effective correction of random width variations. Likewise, the MPROM used in connection with the practice of the present invention preferably contains 2048 addresses instead of the 1024 addresses of the PROM described in the '123 patent. Additionally, the camera output signal processing circuitry utilized in connection with the practice of the present invention is essentially as described in the '123 patent, but preferably that processing circuit is operated at the rate of 10-20 MHz instead of 5-10 MHz as disclosed in the '123 patent.

Referring now to FIGS. 7A through 7E, there is illustrated in block diagram form the preferred embodiment of circuitry for performing automatic adjustment of transverse registration and of the scanning windows to accommodate random width variations in documents that are transported through the scanner. This feature and the method and circuitry disclosed herein for realizing this feature represent a principal improvement over and modification of the prior art. The major components of the circuitry of FIGS. 7A through 7E include a pixel counter 42, the MPROM 56, an A reference register 51, a skew counter 60, a scan line counter 61, and a width register 63. The remaining details of the circuitry are discussed below. First, however, the function of the aforementioned components will be described.

The pixel counter 42 is a modulo 2048 counter that counts continuously after scanner operation is initiated. The instantaneous pixel count in the pixel counter indicates the pixel location of the portion of the "scan line" of the document being read out of the camera. With reference to FIG. 4, the "scan line" corresponds to the distance b+2d+c, or 588+4+10=602 points.

As mentioned, the MPROM 56 contains 2048 addresses of stored information. In terms of pixels, the length of a scan line is 1806 pixels (i.e., 602 points×3 pixels/point), so only 1806 addresses of the MPROM are needed to store document format information. This means that another 242 addresses (i.e., 2048−1806) in the MPROM are available for storing other information, such as information defining guide mark "windows" and marking position "windows" of the camera.

The A reference register 51 contains the location, in pixel counts, of the trailing edge of the guide marks 16. This trailing edge location is used as the scanning reference point for the corresponding row of marking positions 12. See FIG. 4.

The skew counter 60 is provided for the purpose of counting the number of scan lines between the time that one of the guide marks 16 or 18 is first perceived and the other corresponding guide mark 18 or 16 is perceived. As has been mentioned, this count is an indication of the amount of document skew. It should be noted that document skew does not appreciably affect the length of the scan line as perceived by the camera. For example, with reference to FIG. 6, assuming that the overall length L of the scan line is 8.36", and the maximum skew S in one direction is approximately 0.04", the perceived length PL of the skewed scan line is:

$$PL = (L^2 + S^2)^{\frac{1}{2}} = (8.36^2 + 0.04^2)^{\frac{1}{2}} = 8.3600957''$$

Thus, the perceived length PL differs from the actual length L by less than 0.0001", which is a negligibly small fraction of one pixel. The maximum skew, therefore, has a negligible effect on the perceived length of the scan line. However, skew does change the position of the material to be scanned relative to the photosensitive elements of the camera. For this reason, skew must, and is, measured as scanning proceeds, and optical sensing is effectively discontinued if skew exceeds a preset limit, as will be appreciated hereinafter.

The scan line counter 61 is provided for the purpose of counting the number of scan lines in each row of marking positions 12. Since the Fairchild Model 1500R utilizes square photosensitive elements, each element forms one pixel in the direction perpendicular to the scan line as well as along the scan line. Thus, at three pixels per point, three adjacent scan lines cover one point of the document in the direction perpendicular to that of the scan.

Referring to FIG. 5, it will be recalled that each row of marking positions occupies 12 points (i.e., the distance m). Each row thus requires 36 adjacent scans (i.e., 12 points×3 pixels/point). These 36 adjacent scans per row are normally distributed as follows:

9 scans for the guide marks (3 scanning lines/point ×3 points);

24 scans for the marking positions (3 scanning lines/point×8 points) - only 18 of these 24 scans are sensing scans;

3 scans for clearance to the next row.

The width register 63 is provided for the purpose of storing the actual width of the document, expressed with respect to a reference width. The actual width is physically measured as the number of pixels between the trailing edges of the guide marks 16, 18, and it is expressed in the width register as this number of pixels minus the reference width, 1763 pixels. As explained hereinafter, the width correction technique of the present invention processes each document as if it were shrunk by the maximum correctable amount, i.e., 7 pixels. The reference width, 1763 pixels is equal to the nominal number of pixels between the trailing edges of each pair of guide marks 16, 18, but decreased by 7 pixels. With reference to FIG. 4, this represents the distance b+d or 588+2=590 points. In terms of pixels, this translates to 590 points×3 pixels/point 1770 pixels. Therefore, the reference width is 1770−7=1763 pixels. In the normal operation of the scanner of the present invention, the actual width of the document is measured at least twice in each marking position row to ensure that the measure is not affected by printing imperfections or minor smudges.

Figure 7B:
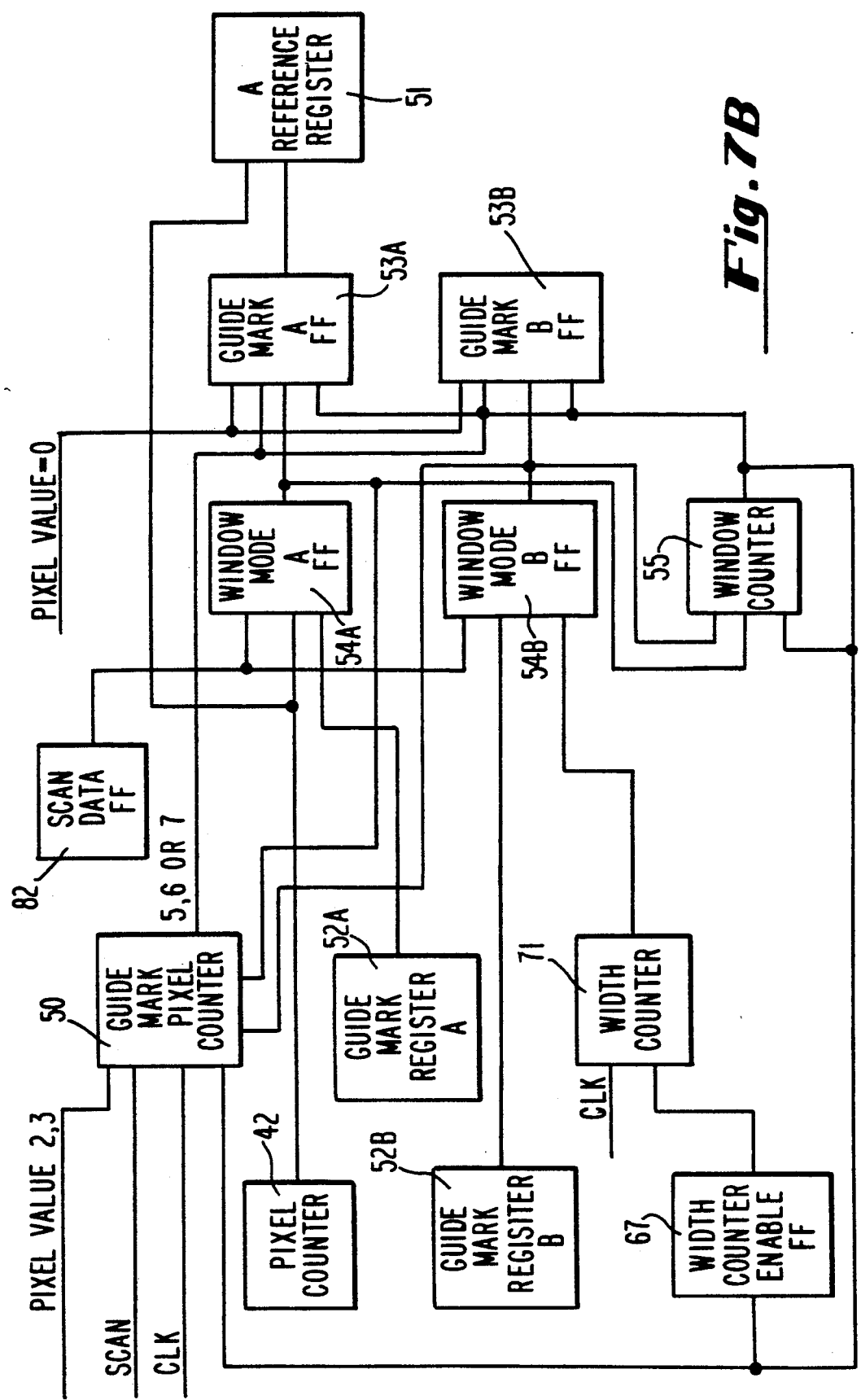
Figure 7C:
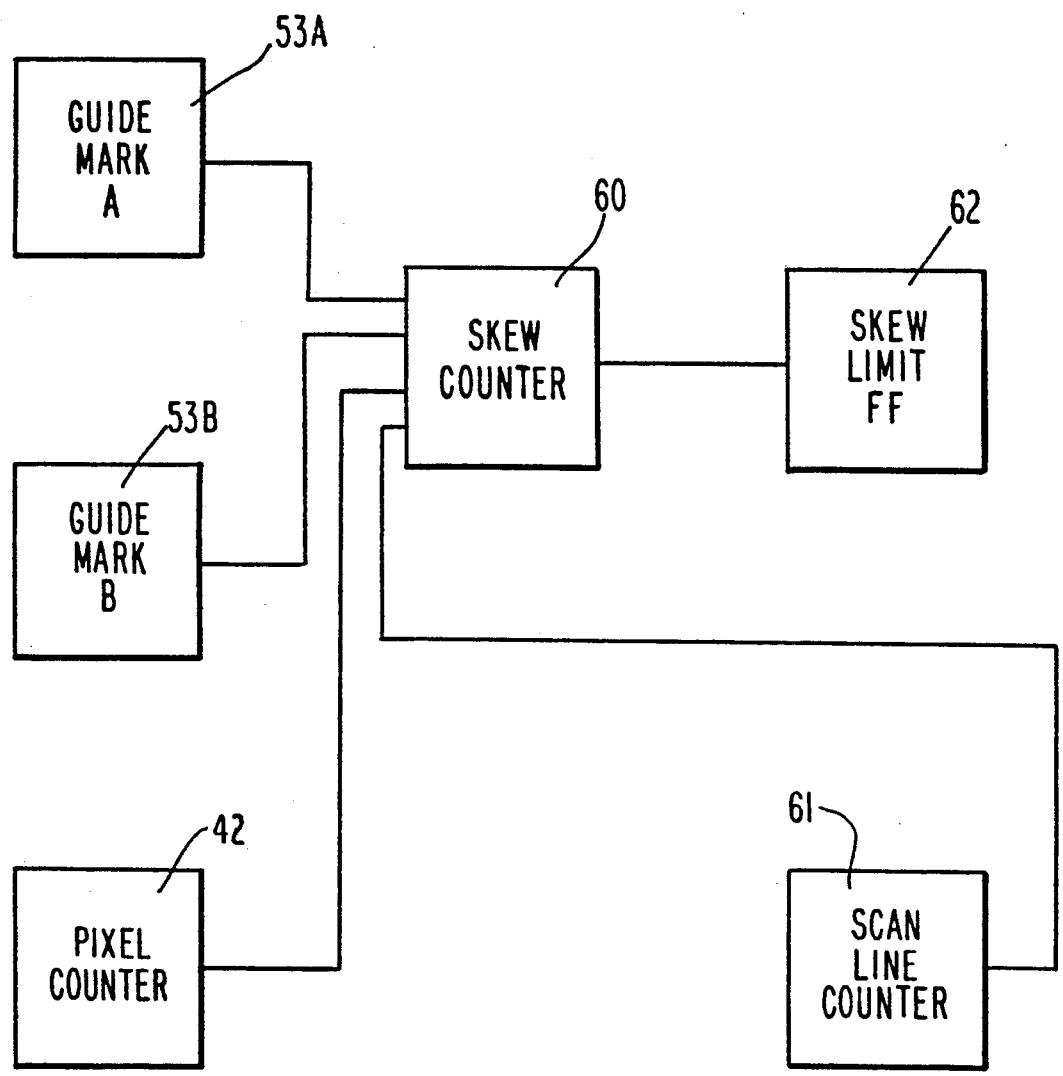
Figure 7D:
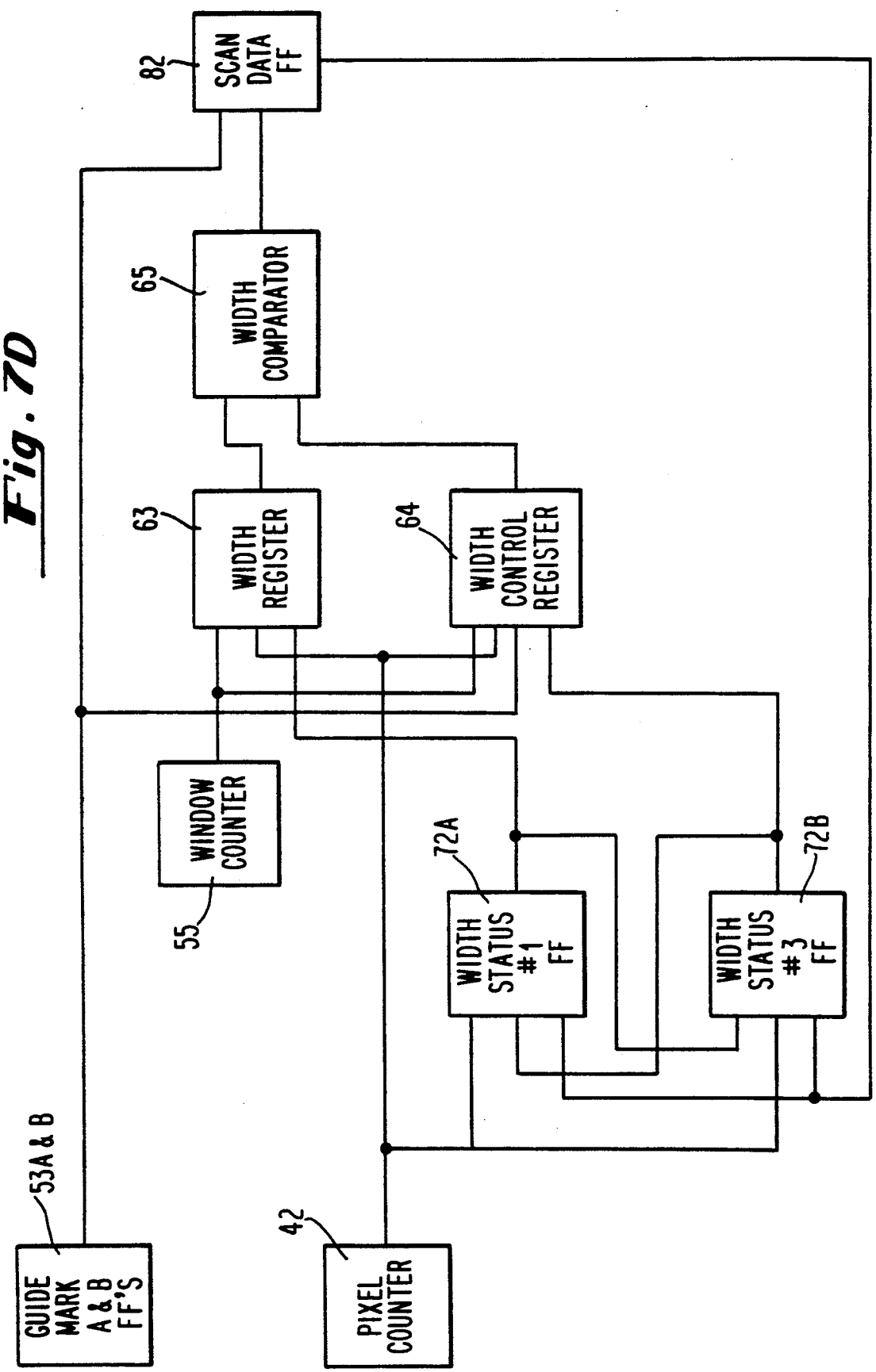
Figure 7E:
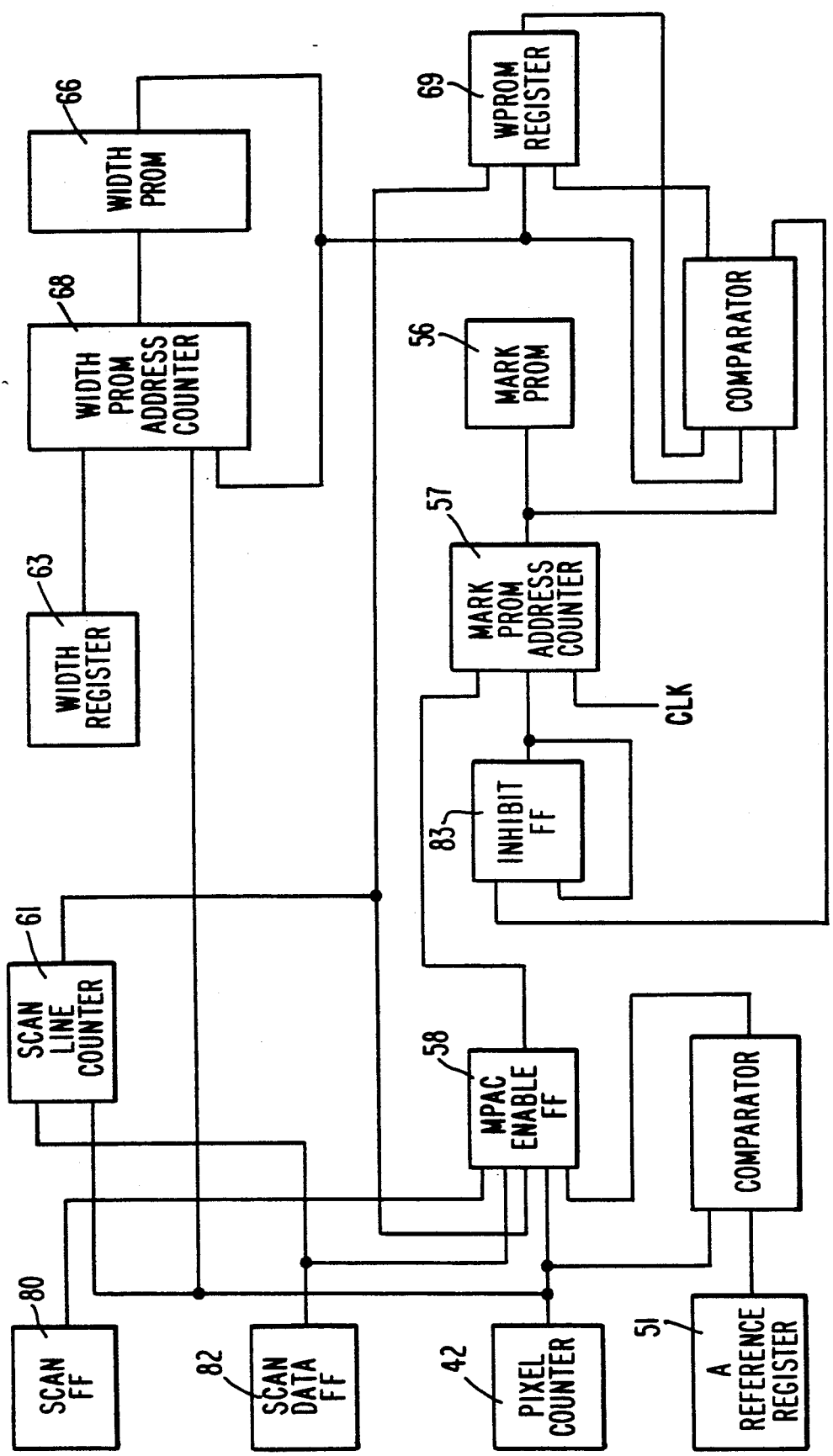

Referring to FIGS. 7A through 7E, a block diagram of the preferred embodiment of processing circuitry according to the invention is shown. FIG. 7A illustrates initialization circuitry, i.e., for processing documents when they are initially transported through the scanner. FIG. 7B illustrates guide mark acquisition circuitry. FIG. 7C illustrates skew measurement circuitry. FIG. 7D illustrates width measurement circuitry. FIG. 7E illustrates width correction circuitry. FIGS. 7A-7E illustrate the logical components and logical connections therebetween for performing each of the aforementioned functions. The function of each of the principal components will now be explained.

Referring to FIG. 7A, there is illustrated the initialization circuitry comprising a camera 40, a clock 41, a pixel counter 42, a begin sheet flip flop 43, a format flip flop 44, a pair of guide mark registers A and B ("GMRA" and "GMRB") designated 52A, B, a mark PROM ("MPROM") 56, a mark PROM address counter ("MPAC") 57, and a scan flip flop 80. The camera 40 is preferably of the type hereinbefore described, i.e., a Fairchild Model 1500R. The clock 41 is the main clock of the system and maintains synchronism between the camera and the remainder of the logic circuitry.

The function of the pixel counter ("PC") 42 has been described above. In summary, the pixel counter 42 controls the camera loop and provides timing relationships for scan lines. It operates continuously and counts from 0 to 2047, then repeats.

The function of the begin sheet flip flop 43 is to indicate that the beginning of a document 10 has been presented to the camera 40. The begin sheet flip flop is set to 1 upon sensing the beginning of a document. It is set to 0 when the pixel counter 42 reaches a count of 23 (PC=23) and provides entry into format loading logic as explained herein.

The function of the format flip flop 44 is to provide control of format loading logic. The format flip flop 44 is set to 1 whenever the begin sheet flip flop is set to 1 and the value of the pixel counter is 1 (PC=1). The format flip flop is set to 0 when the value of the pixel counter reaches 23 (PC=23) and the scan flip flop 80 is set to 1.

The guide mark register A (GMRA, 52A) is set during a format loading operation to the beginning pixel counter address of a window A. The guide mark register B (GMRB, 52B) is set to the pixel counter address of a window B. The function of the windows will become apparent hereinafter.

The MPROM 56 contains the format information for the guide mark registers A, B (GMRA, GMRB, 52A and 52B) within its first 24 positions. The remainder of the MPROM contains mark position information.

The MPAC 57 is an address counter for providing addresses to the MPROM 56. The MPAC is set to a count of 32 during width correction at the detection of a trailing edge of a guide mark 16.

The scan flip flop 80 is set to 1 at the end of a format loading routine (described below) and stays set to 1 until the end of the document is sensed.

The guide mark acquisition circuitry (FIG. 7B) comprises a guide mark pixel counter 50, an A reference register 51, a pair of guide mark flip flops A and B designated 53A, B, a pair of window mode flip flops A and B designated 54A, B, a window counter 55, a width counter enable flip flop 67, a width counter 71, and a scan data flip flop 82. The pixel counter 42 and guide mark registers A and B, 52A, B, are also shown on FIG. 7B to indicate that their outputs contribute to the circuitry.

According to the invention, each pixel reports an integer value from 0 to 3, with 0 representing a white background. One represents a light value of gray and, according to the invention, is unacceptable for guide mark recognition. Values of 2 and 3 represent darker values of gray and are acceptable for guide mark recognition.

The function of the guide mark pixel counter ("GMPC") 50 is to count the number of pixels having a value of 2 or 3 within a guide mark window. The guide mark pixel counter must reach a count of 5, 6 or 7 in order to recognize a guide mark 16, 18. Any count over 7 is invalid. The guide mark pixel counter is set to 0 when the window counter (discussed below) reaches a count of 23.

The function of the A reference register 51 is to maintain the location, in pixel counts, of the trailing edge of the guide marks 16. This trailing edge is used as the scanning reference point for the corresponding row of marking positions 12. The A reference register 51 is set to the value of the count of the pixel counter 42 when a guide mark 16 is first detected until the scan data flip flop 82 (discussed below) is set to 1. It is used to provide a reference to start the MPAC 57 during width correction.

The guide mark flip flop A (53A) is set to 1 when the guide mark 16, nearest to the mechanical registration edge of the document, is recognized. The guide mark flip flop B (53B) is set to 1 when the guide mark 18, on the opposite edge of the document, is recognized. Both of these flip flops are set to 0 at the end of a scan line.

The window mode flip flop A (54A) is set to 1 when the value of the count in the guide mark register A (GMRA, 52A) is equal to the value of the count in the pixel counter 42. The window mode flip flop A allows the window counter 55 (discussed below) to search for the guide mark 16. It is set to 0 when the value of the count in the window counter 55 is 23.

The window mode flip flop B (54B) is set to 1 when the value of the count in the guide mark register B (GMRB, 52B) is equal to the value of the count in the width counter 71 (discussed below). This flip flop allows the window counter 55 to search for the guide mark 18. It is set to zero when the value of the count in the window counter 55 reaches 23.

The window counter 55 counts from 0 to 23 while the scan data flip flop 82 is set to 0 and either of the window mode flip flops A or B is set to 1. The window counter allows the circuitry to search for a guide mark. At a count of 23, it is reset to 0. In effect, the window counter is a modulo 24 counter.

The width counter enable flip flop 67 is used to enable the advance of the width counter 71.

The width counter 71 starts counting when a guide mark 16 is first recognized. If the guide mark 16 is not recognized, the value of the count in the width counter is set to 9 and it starts counting when the value of the count in the window counter 55 is 23. The value of the count in the width counter 71 is set to 0 at the start of guide mark logic explained below (see block 401 of the flowchart of FIG. 8D).

The scan data flip flop 82 is set to 1 when both guide marks have been recognized and an acceptable width measurement has been obtained. It is set to 0 when the scan line counter 61 reaches a count of 33.

The skew measurement circuitry (FIG. 7C) comprises a skew counter 60, a scan line counter 61, and a skew limit flip flop 62. The guide mark A and B flip flops, 53A, B and the pixel counter 42 are also shown on FIG. 7C to indicate that their outputs contribute to the circuitry.

The skew counter 60 is preferably a 3-bit counter that counts the number of scanning lines from the first detected guide mark 16, 18 to the second detected guide mark 18, 16. If the skew counter 60 reaches a count of 4, the skew limit flip flop 62 is set to 1. The skew counter is set to 0 when the value of the count in the scan line counter 61 (discussed below) is equal to 33.

The scan line counter 61 counts the number of scan lines from the time that both guide marks, 16, 18 are first detected until it reaches a count of 33.

The width measurement circuitry (FIG. 7D) comprises a width register 63, a width control register 64, a width comparator 65, and a pair of width status flip flops 1, 3, 72A, B. The pixel counter 42, guide mark A and B flip flops 53A, B and window counter 55 are also illustrated to indicate that their outputs contribute to the circuitry. Also, as shown, the scan data flip flop 82 receives input from and provides output to the circuitry.

The width register 63 is set to correspond to the four least significant bits of the window counter 55 after both guide marks have been recognized. This value is utilized as the measurement of the document's relative width.

The width comparator 65 is used to check if contents of the width control register are equal to those of the width register.

The width control register 64 is a bidirectional counter that is utilized to check for a variation of plus or minus 1 pixel. It is set to the value of the least significant 4 bits of the window counter 55 upon the second measurement of width.

The width status flip flop 1, 72A, is set to 1 when both guide marks 16, 18 are recognized and the width status flip flop 1 is equal to 0. If the width measurement is not within the tolerance of plus or minus 1 pixel, width status flip flop 1 is set to 0 and width status flip flop 3, 72B, is set to 1. The width status flip flop 3, 72B, is set to 1 if the contents of the width register 63 and of the width control register 64 do not agree. Both the width status flip flops 1 and 3 are set to 0 when the scanning of a row is completed.

The width correction circuitry (FIG. 7E) comprises an MPAC enable flip flop 58, an inhibit flip flop 83, a width PROM address counter 68, a width PROM 66 and a width PROM register 69. Components 42, 51, 56, 57, 61, 63, 80 and 82 are also illustrated to indicate that they receive input from or provide output to the circuitry.

The MPAC start enable flip flop 58 is set to 1 when the value of the count in the pixel counter is 24 (PC=24) during width correction. It is set to 0 when the value of the count in the pixel counter is equal to the value of the count in the A reference register 51 discussed below.

The inhibit flip flop 83 is used to block one clock pulse from the pulse stream to the MPAC 57.

The width PROM address counter 68 provides address information for the width PROM GG.

The WPROM register 69 is used in connection with width correction. The width correction address requires 11 bits. The WPROM 66 utilizes an 8-bit word necessitating the use of two words per address. The WPROM register 69 retains the high order word while the second word is available as data from the WPROM 66.

The width correction PROM (WPROM) 66 contains two sets of tables as set forth in FIGS. 9A through 9E. The first 16 locations of the WPROM 66 contain indirect addresses to the starting addresses of width position data in the second table.

The broad information processing operations that the circuitry of FIGS. 7A through 7E performs after initiation of scanner operation is set forth below. Details of the processing sequence are set forth in the following section (part III).

1. As scanning proceeds, detect the beginning of the document 10. Reset the pixel counter 42 to zero. Transfer the pixel count starting addresses of the windows for guide marks 16, 18 from the MPROM 56 into guide mark registers A and B, 52A, 52B.

2. Locate and identify the first perceived guide mark 16 or 18. If it is 16, store the location of its trailing edge in the A reference register 51. Initiate counting of scanning lines in the skew counter 60.

3. Locate and identify the second perceived guide mark 16 or 18. If it is 16, store the location of its trailing edge in the A reference register 51. Stop the skew counter 60 and start the scan line counter 61.

4. Determine whether the second perceived guide mark was found before the skew counter 60 reached the predetermined skew limit. If the predetermined skew limit has been reached, proceed to step number 5 below. Otherwise, skip step number 5 and proceed to step number 6.

5. Supply an output signal indicating that the document cannot be scanned.

6. Determine the number of pixels between the trailing edges of the guide marks 16, 18 and store the four least significant bits thereof as a first measurement of the width in the width register 63.

7. Perform a second width measurement (from another scan) and store the four least significant bits thereof in the width control register 64.

8. Present first and second width measurements to the width comparator and determine whether the first and second width measurements agree within ±1 pixel. If the measurements do not agree within ±1 pixel, proceed to steps numbers 9 and 10 below. If the measurements do agree within ±1 pixel, proceed directly to step 11.

9. Perform a third width measurement (from another scan) and store the four least significant bits thereof in the width register 63.

10. Determine whether the second and third width measurements agree within ±1 pixel. If the measurements agree within ±1 pixel, proceed to step number 11 below. Otherwise, perform the function indicated by step number 5.

11. Immediately after the scan line counter 61 reaches a count of 15 scan lines, read pencil marks from the document while performing width correction under control of the width register 50 and width correction table (see part III hereof). Continue until the scan line counter 61 reaches a count of 33, then stop reading.

12. Determine whether the end of the document has been reached. If the end of the document has been reached, proceed to step number 13. If the end of the document has not been reached, repeat steps numbers 2-12.

13. Wait for next document.

Part III: Detailed Logic Flow Diagram

Referring now to FIGS. 8A through 8H, the logical operations performed by the circuitry of FIG. 7A through 7E will be explained in greater detail.

Figure 8A:
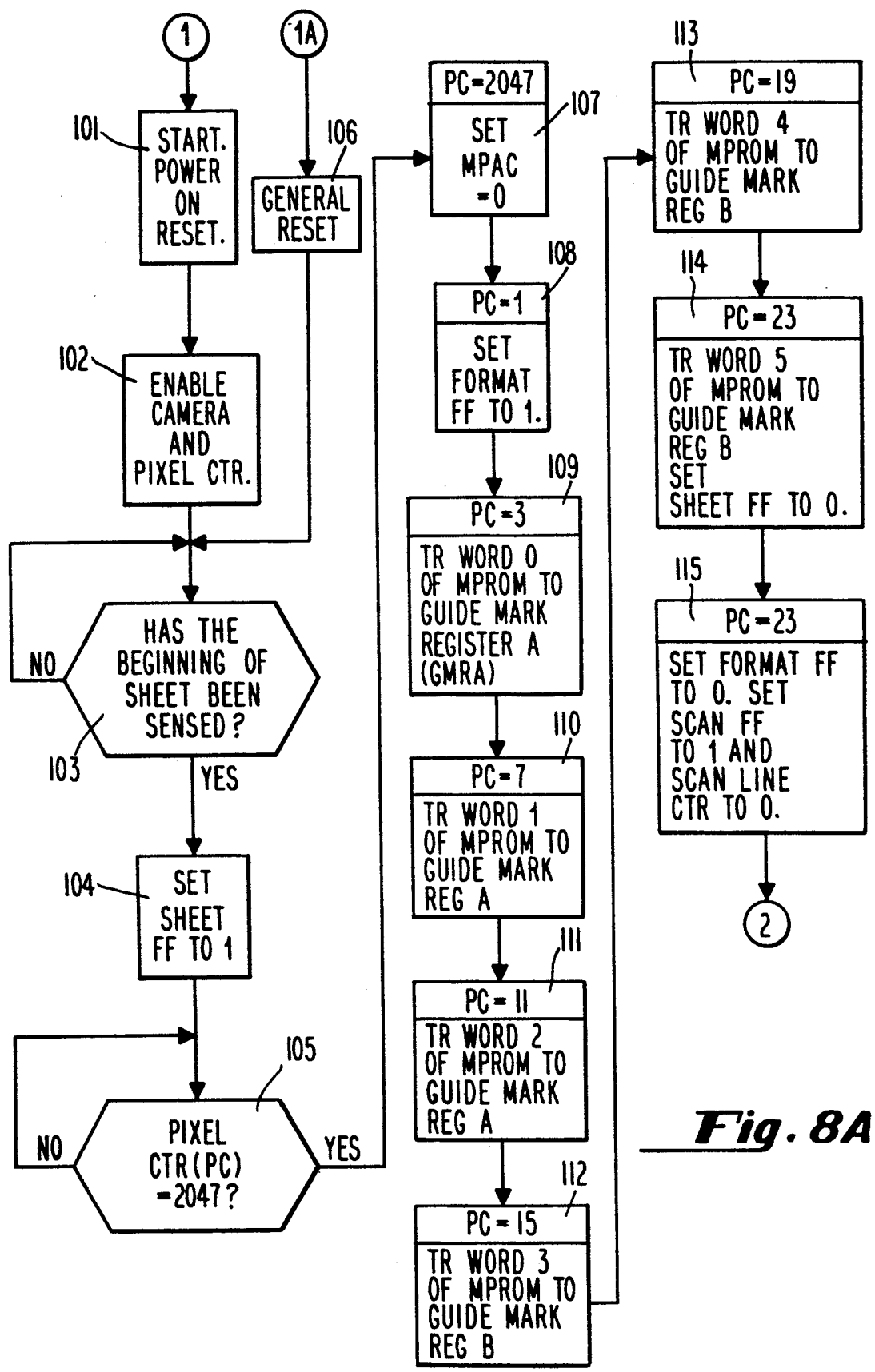

Referring to FIG. 8A, representing the format loading logic, upon a power on condition, all counters, registers and flip flops are reset as shown at 101. As shown at 102, the pixel counter 42 and the camera 40 are enabled. The pixel counter runs continuously throughout the remainder of the steps shown in the flowcharts of FIGS. 8A through 8H.

Upon sensing the beginning of a document 10, the sheet begin flip flop 43 is set to 1, as shown at 103 and 104. At step 105, a test is made to determine whether the value of the count of the pixel counter 42 has reached 2047. If it has, then the MPAC 57 is set to 0 as shown at 107. Note that a value of the pixel counter 42 is depicted in each of the steps 107 et seq. The function described in each such step takes place when the pixel counter has reached the noted count.

As shown at 108, when the value of the pixel counter is 1, the format flip flop 44 is set to 1. When the value of the pixel counter reaches 3, word 0 of MPROM 56 is transferred to the GMRA 52A as shown at 109. (See FIG. 9.) As shown at steps 110-114, words 1, 2, 3, 4 and 5 are transferred from the MPROM 56 to either the GMRA 52A or GMRB 52B, upon pixel counts of 3, 7, 11, 15, 19 and 23. As shown at step 114, upon a pixel count of 23, the begin sheet flip flop 43 is set to 0. When the pixel count reaches 23, the format flip flop 44 is set to 0, the scan flip flop 80 is set to 1 and the scan line counter 61 is set to 0, as shown at 115.

From the foregoing, it will be appreciated that after the beginning of a document has been sensed the format data from the first six words of the MPROM is stored in the registers GMRA and GMRB. Each register contains 11 bits which represent the starting pixel counter address of the two guide mark "look" or scanning windows.

Figure 8B:
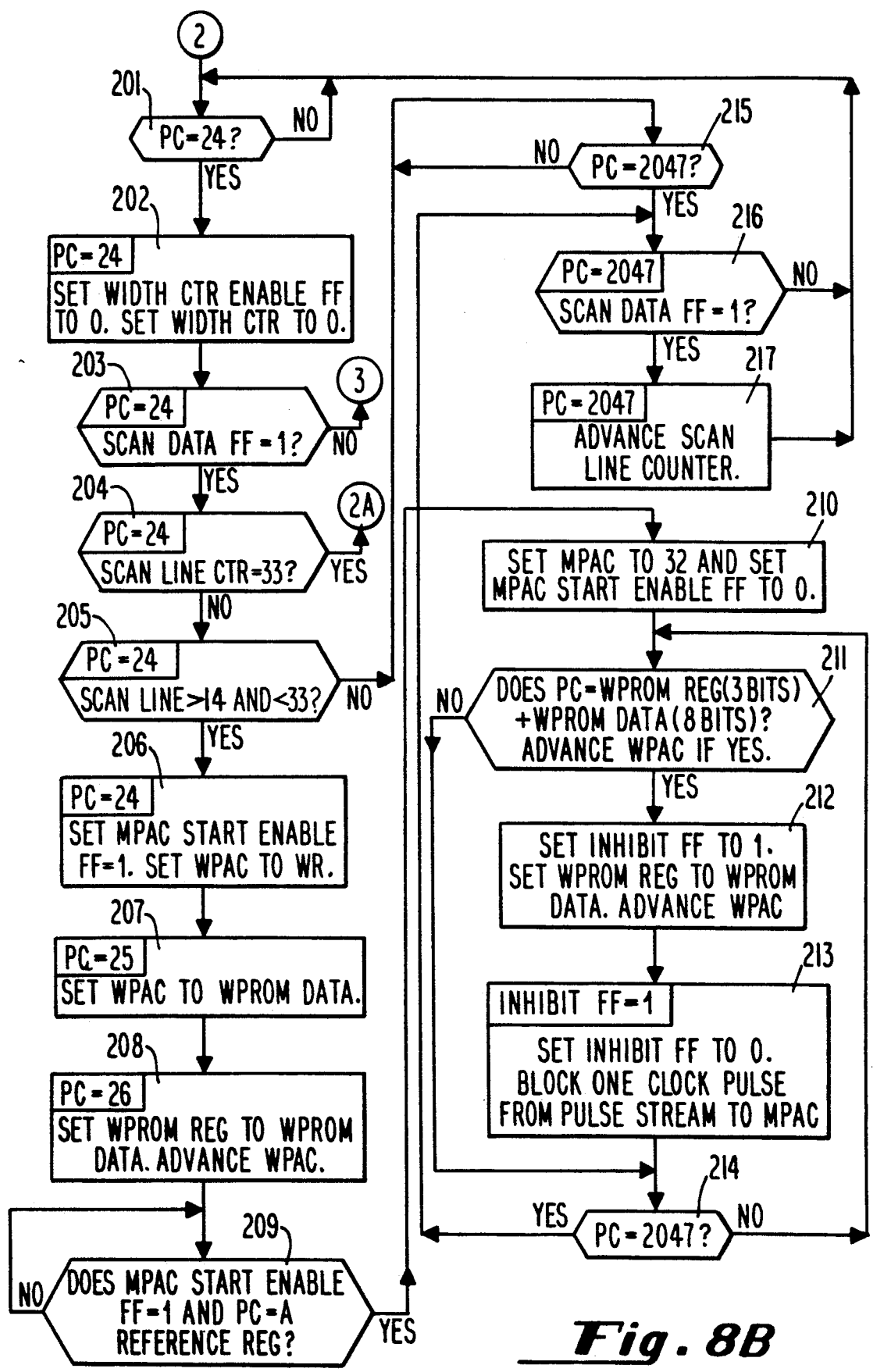
Figure 8C:
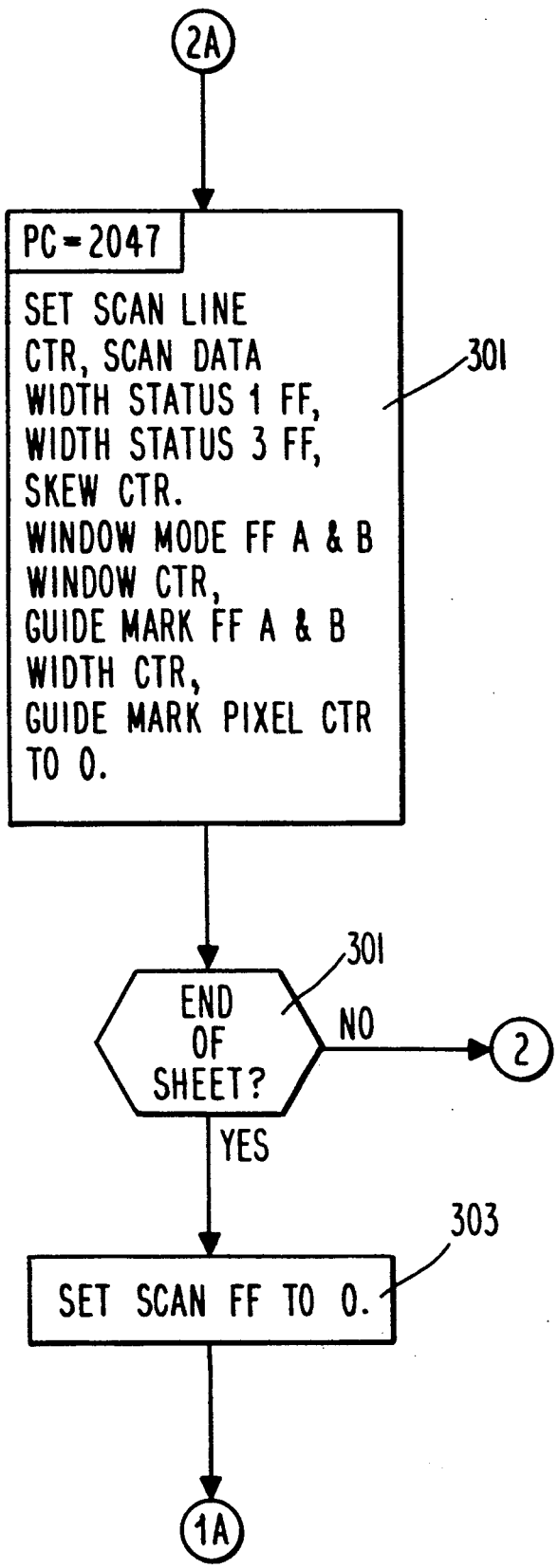
Figure 8D:
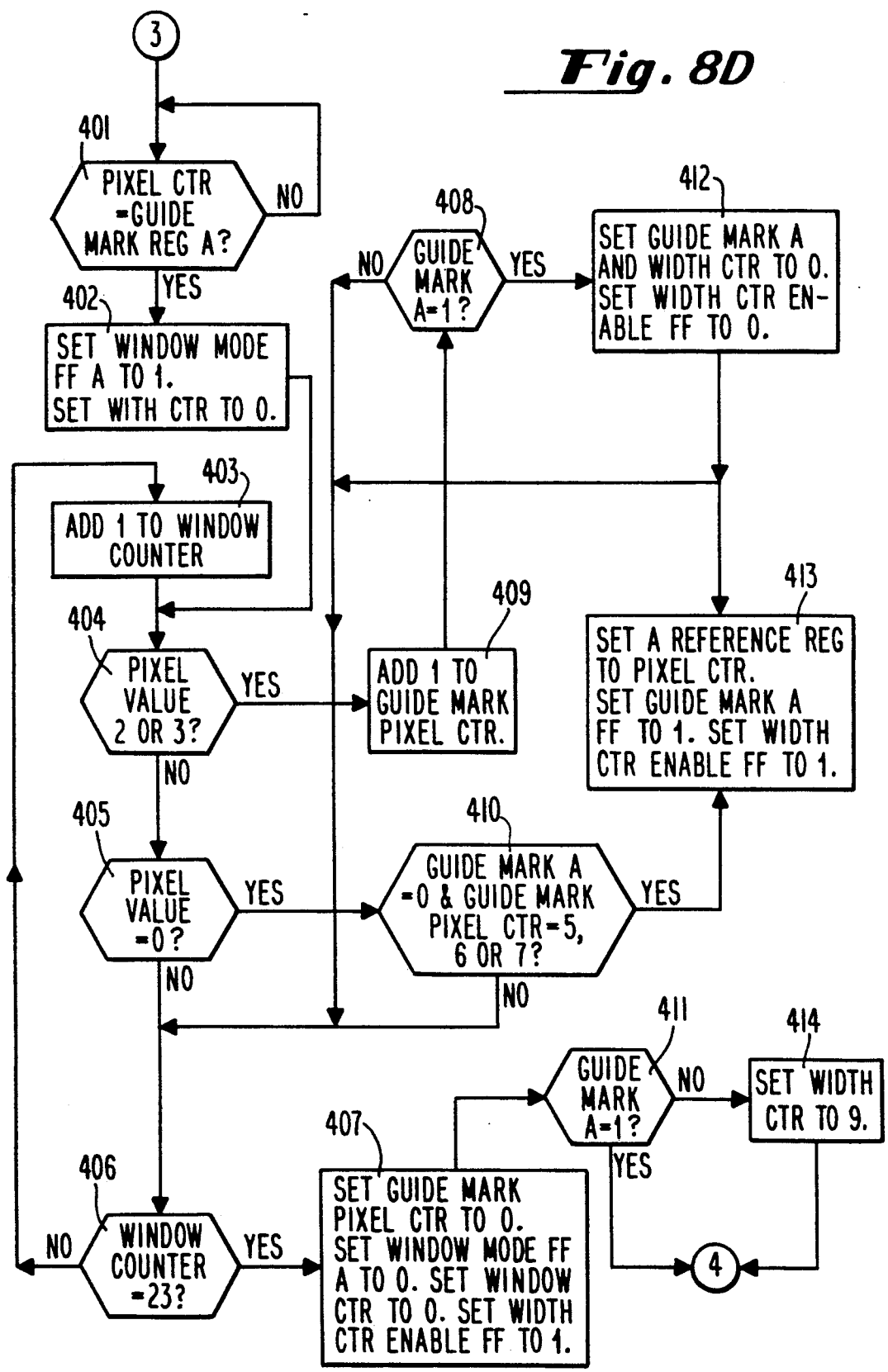

FIG. 8B illustrates the width correction functions that are performed on active data scanning lines. As illustrated at step 201, this occurs when the pixel counter has reached a count of 24. When the pixel counter has reached the count of 24, the width counter enable flip flop 67 and width counter 71 are set to 0 as illustrated at 202. As shown at 203, 204, and 205, three different processing paths are available when the pixel counter has reached a count of 24. Thus, as illustrated at 203, when the scan data flip flop 80 is equal to 0 and the value of the pixel counter is 24, processing proceeds as illustrated in FIG. 8D where a search for guide marks 16, 18 is performed. If, however at 203, it was determined that the scan data flip flop 80 is equal to 1, then this indicates that the guide marks 16, 18 have been located, and the test illustrated at step 204 is performed. Thus, at step 204, if it is determined that the scan line counter has reached a count of 33, then end of row resets are indicated and performed as illustrated in FIG. 8C. However, if the scan line counter has not reached a count of 33, then a further test is performed as illustrated at step 205. Hence, at step 205 a test is made to determine whether the value of the scan line counter is between 14 and 33. If it is, then processing proceeds as illustrated at steps 206 et seq.; otherwise processing proceeds as illustrated at step 215 et seq.

If, as a result of the test at 205 it was determined that the value of the scan line count is between 14 and 33, then this indicates that active scan lines are still being processed. If this is so, then, as shown at 206, the MPAC start enable flip flop is set to 1. This flip flop allows the logic to wait for the pixel counter to equal a count stored in the A reference register 51 which retains the pixel counter count at the trailing edge of guide mark 16 in step 209. Also, at step 206, the WPAC 68 is set to the value contained in the width register (WR) 69 which contains the four least significant bits of the value of the width between the two guide marks 16, 18. A width register value of 0 indicates that no correction is required. This is the minimum width between guide marks 16, 18 that is acceptable. The maximum acceptable value is 15 and the nominal value is 7.

The width value serves as an indirect address for pixel counter addresses stored within the WPROM 66, which uses an 8 bit word. See FIG. 9. In order to accommodate an 11 bit pixel counter address, two adjoining words of the WPROM are used. As shown at step 207, the WPAC 68 is set to correspond to data from the WPROM data bus which was previously addressed in step 206. This is the WPROM address of the three most significant bits of the pixel counter address at which the first correction will be made. As shown at step 208, the WPROM register 69 is set to the three most significant bits of the pixel counter address. The WPAC 68 is incremented by 1. The eight least significant bits of the pixel counter address will be available for use in step 211.

As shown at step 209, when the value of the count in the pixel counter 42 is equal to the value of the data in the A reference register 51 (which was previously set to the value of the pixel counter count at the end of guide marks 16 at step 413), then the functions illustrated at step 210 are performed. At block 210, the MPAC 57 is set to 32 and will be permitted to count to the end of the scan line. This permits the timing relationship to be relative to the trailing edge of guide marks 16. Also, at step 210, the MPAC start enable flip flop 58 is set to 0.

At step 211, there is a wait for the pixel counter count to equal the width correction address. Once they are equal, processing continues to step 212; if they are not equal, an end of the scan line check is made as shown at step 214.

At step 212, the inhibit flip flop 83 is set to 1. The contents of the WPROM register 69 are set to the value on the WPROM data bus in order to obtain the three most significant bits of the pixel counter address, and the WPAC is incremented by 1. At step 213, one clock pulse is blocked from the pulse stream to the MPAC which causes a one pixel delay, effectively allowing a one-pixel correction. At step 214, a test is made for the end of the scan line. If the end of the scan line has not been reached, then steps 211 et seq. are repeated. If, at the end of a scan line the scan data flip flop is equal to one, as shown at 216, then the scan line counter 61 is advanced by one as shown at 217, and there is a wait for the next scan line as indicated at 201.

FIG. 8C illustrates end of row reset functions. The functions illustrated in block 301 are performed upon a transfer from step 204 and when the value of the pixel counter is 2047. If the end of the sheet has not been reached, then control returns to step 201 as indicated at step 302. Otherwise, as illustrated at step 303, if the end of the document has been reached, the scan flip flop 80 is set to 0 and control returns to step 106 of FIG. 8A.

FIG. 8D illustrates the functions that are performed in searching for the guide mark 16. As illustrated at step 401, there is a wait for the value of the pixel counter to equal the value of the GMRA 52A. This signals the beginning of the "look" or scanning window for guide mark 16.

At step 402, the window mode flip flop A (54A) is set to 1 and this activates the "look" window. The window counter 55 was previously set to 0 at step 507. As illustrated at step 405, the pixel values should normally be 0 for the first pixel. There are four pixel values: 0=no response: 1=light gray: 2=gray: and 3=dark. The guide mark pixel counter 50 will be less than 5 and the window counter 55 is less than 23 at step 406 so that only the window counter is advanced as shown at 403.

At step 405, with a pixel value of 1, nothing happens except that the window counter 55 is advanced as shown at 403. If there is a pixel value of 2 or 3, the guide mark pixel counter 50 will be advanced as shown at 404 and 409.

At step 405, with a pixel value of 0, a jump will be made to step 410 where a value of 5, 6, or 7 in the guide mark pixel counter 50 will signal the recognition of the trailing edge of a guide mark 16.

At step 413, the contents of the A reference register 51 are set to the value of the pixel counter for use at step 209. Guide mark flip flop A (53A) is set to 1 so that there is an indication that the guide mark 16 was recognized. The width counter enable flip flop 67 is set to 1 to allow the width counter 71 to start counting. If no other pixel count of 2 or 3 is encountered before the window counter 55 reaches a count of 23, this will be guide mark 16 actually recognized. If there are extraneous marks near the guide marks 16 after recognition, guide mark flip flop A (53A), width counter 71 and width counter enable flip flop 67 will be set to 0 as shown at 412, and a new search for guide mark 16 will take place.

If no recognition of guide mark 16 takes place, the width counter 71 will be started at a value of 9 in order to start the "look" window B at the optimum position on the scan line, as shown at steps 407, 411 and 414.

Figure 8E:
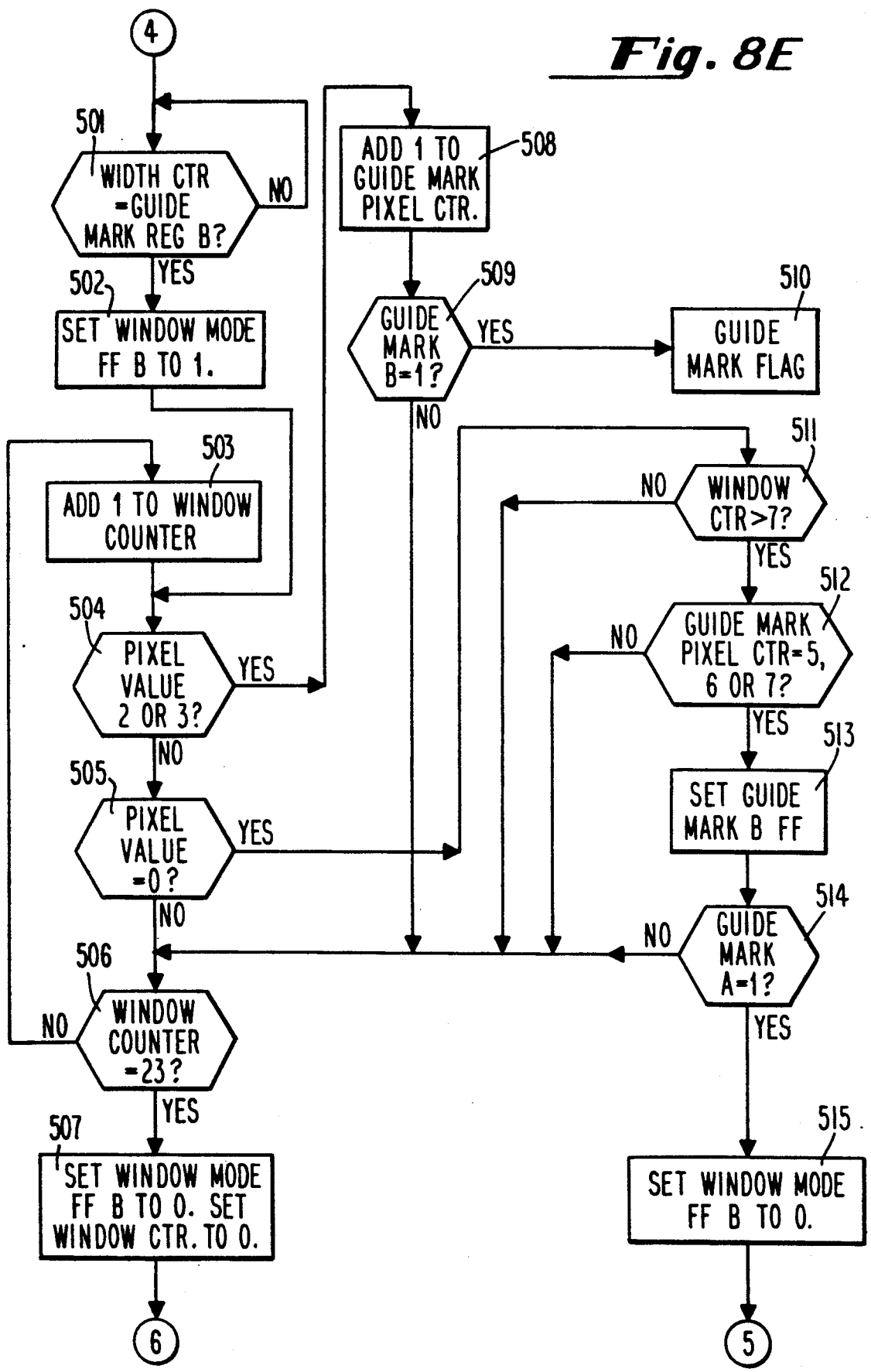
Figure 8F:
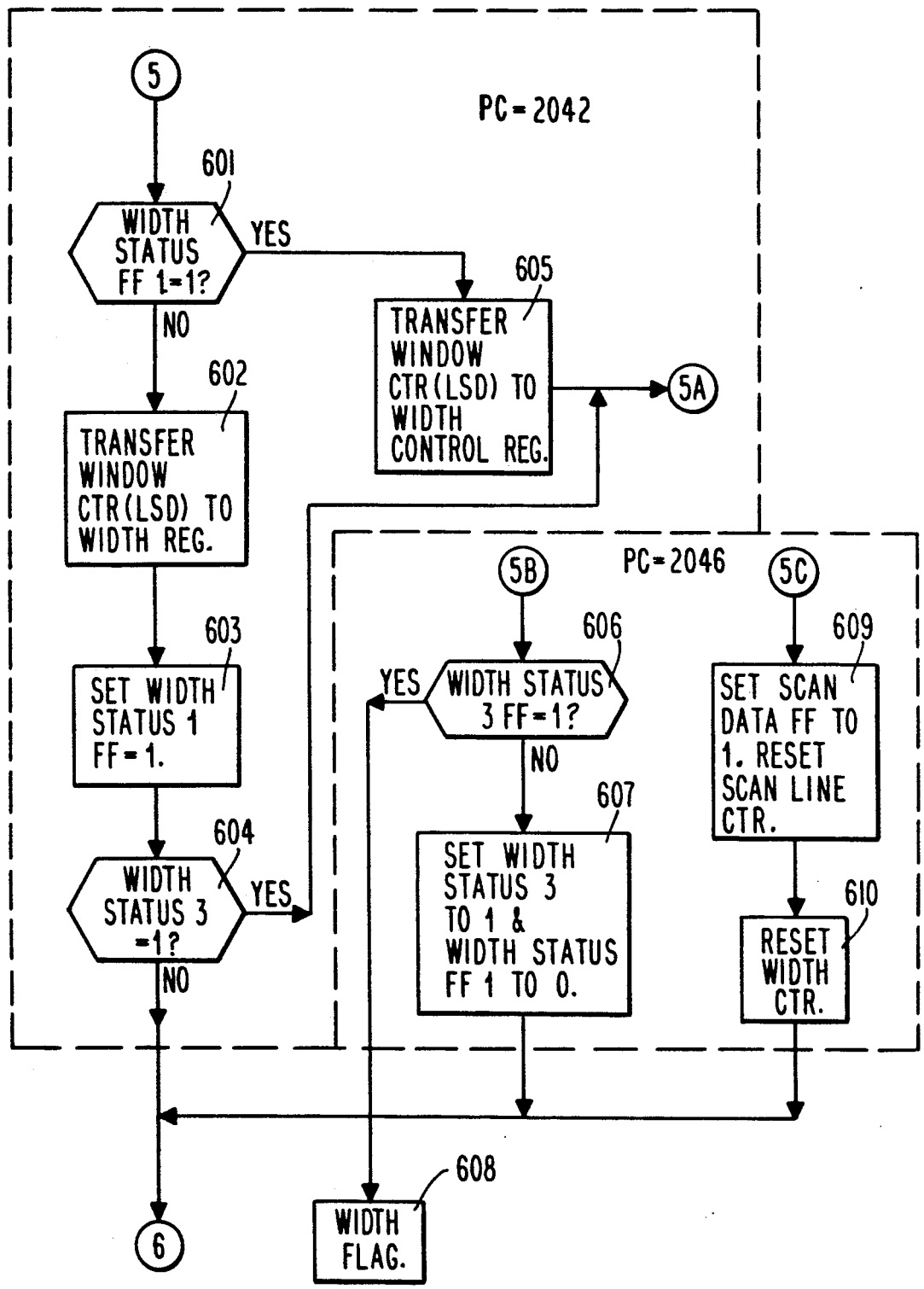
Figure 8H:
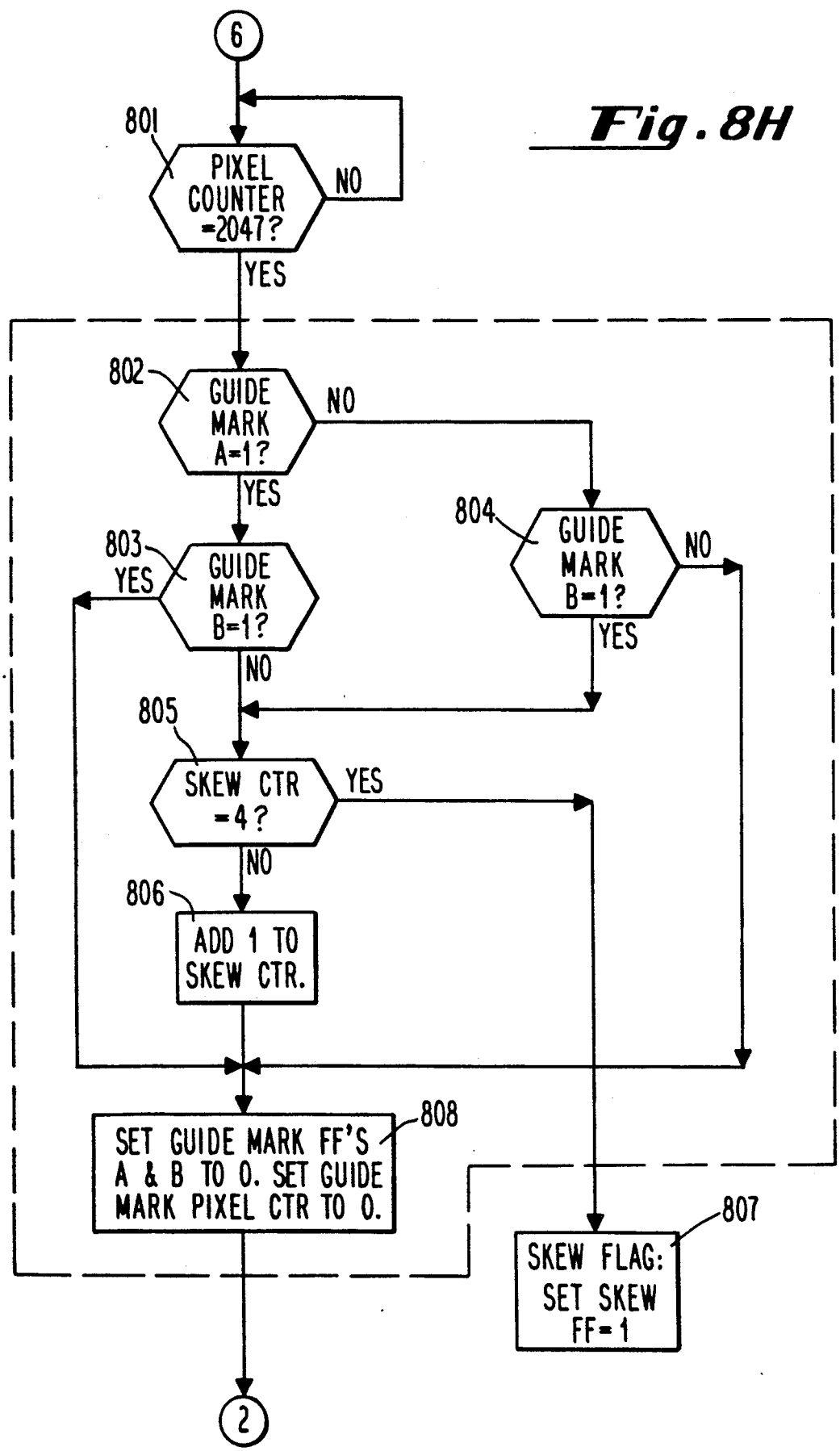

FIG. 8E illustrates the functions that are performed in connection with the search for a guide mark 18. The logical flow is similar to that illustrated and explained in connection with FIG. 8D. At step 501, there is a wait until the value of the width counter 71 is equal to the value of the GMRB 52B. The width counter 71 was started at the trailing edge of guide mark 16. If both guide marks are detected at step 515, the window mode flip flop B 54B and the window counter 55 are set to 0, and the steps illustrated in FIG. 8F are performed. If guide mark B is not detected, the functions illustrated in FIG. 8H are performed, as shown at step 507.

FIGS. 8F and 8G illustrate the functions performed in connection with width measurement. Referring to FIG. 8F, if the width status flip flop 1 72A is equal to 0 (step 601), the contents of the window counter 55 are transferred to the width register 63, as shown at step 602. The width status flip flop 1 72A is set to 1 (step 603) and, if the width status flip flop 3 72B is equal to 0 (step 604), then the functions illustrated in FIG. 8H are performed next. However, if the width status flip flop 3 72B is equal to 1, then the functions illustrated in FIG. 8G are next performed. If, at step 601, the width status flip flop 1 72A was set to 1, then the contents of the window counter 55 are transferred to the width control register 64, as shown at step 605, and the functions illustrated in FIG. 8G are next performed.

As illustrated in FIG. 8F, if the contents of the width register 63 equal the contents of the width control register 64 (step 701), then steps 609, 610 of FIG. 8F are performed, i.e., the scan data flip flop 82 is set to 1 and the scan line counter 61 and width counter 71 are set to 0.

As shown at step 702, if the contents of the width register 63 are not equal to the contents of the width control register 64, then 1 is subtracted from the contents of the width control register 64. As shown at step 703, if the contents of the width register 63 and the width control register 64 are equal after the subtraction, then steps 609 and 610 of FIG. 8F are performed. Otherwise, the contents of the width control register 64 are incremented twice (steps 704 and 705), and another test is performed at step 706. Thus, at step 706, if the contents of the width register 63 and the width control register 64 are equal, then steps 609 and 610 of FIG. 8F are performed. If their contents are not equal, then steps 606 and 607 of FIG. 8F are performed. At step 606, if the width status flip flop 3 72B is equal to 0, then step 607 is performed where the width status flip flop 3 72B is set to 1 and the width status flip flop 1 72A is set to 0. This permits another width measurement to be performed. However, if at step 606, the width status flip flop 3 72B is equal to 1, then a width flag is set as shown at 608.

FIG. 8H illustrates the functions performed in connection with skew measurement. After the pixel counter has reached a count of 2047 (step 801) guide mark flip flops A and B (53A, B) are tested as shown at steps 802 and 803. If both equal 0 or both equal 1, then step 808 is performed indicating that the skew is acceptable and processing resumes at step 201 of FIG. 8B. However, if the two flip flops are not equal in status, then the skew counter 60 is incremented as shown at step 806. As shown at step 805, if the skew counter reached a value of 4, the skew flip flop 62 is set to 1 to provide a flag that the document skew is unacceptable and that the document cannot be scanned.

Conclusion

There has been described a document scanning and mark sensing apparatus and method that compensates for random variations in document size and provides an indication of document skew. The present invention may be embodied in other specific forms without departing from the spirit or essential attributes thereof and, accordingly, reference should be made to the appended claims rather than to the foregoing specification, as indicating the scope of the invention.

We claim:

1. Method of optically scanning a document having rows of material to be scanned comprising, in combination, the steps of:
   (a) transporting the document beneath a camera, the document having generally parallel sides, the camera scanning the document along a direction substantially parallel to one of the sides;
   (b) automatically providing a measure of document size in at least a direction parallel to the direction of scanning at each row of material to be scanned but before scanning each row of material; and,
   (c) automatically adjusting the scanning of each row of material to be scanned to compensate for random variations in shrinkage and expansion of document size.

2. Method according to claim 1 further comprising the steps of providing several measures of document size at each row to be scanned, comparing at least two of the measurements, and providing an indication that scanning should not continue if the two measures are not within a predefined value of each other.

3. Method according to claim 1 further comprising the step of automatically measuring document skew relative to the camera at each row to be scanned but before scanning each row of material and providing an indication that scanning should not continue if any skew measurement exceeds a predetermined skew limit.

4. Method according to claim 3 wherein the camera comprises an array of photosensitive elements defining pixels, further comprising the step of providing a generally rectangular document having a plurality of rows of generally rectangularly shaped, preprinted marking positions for recording information by means of pencil marks, the marking positions having sides that are generally parallel to sides of the document, each marking position being of an integral number of printer's points, there being three pixels per printer's point, an integral number of pixels substantially completely and exactly corresponding to each marking position.

5. Method according to claim 4 wherein the step of providing a measure of document size comprises the steps of:
   (a) scanning the document along scan lines;
   (b) counting, along a scan line, the number of pixels between edges of marks adjacent each end of the row.

6. Method according to claim 5 wherein the step of measuring document skew comprises the steps of:
   (a) detecting a mark adjacent one side of a row of material to be scanned, counting the number of scan lines following detection of the mark, and comparing the count to a predetermined scan line count; and,
   (b) providing the indication that scanning should not continue if, before detecting a mark adjacent the other side of the row, the count exceeds the predetermined scan line count.

7. Method according to claim 6 wherein the camera comprises means defining scanning windows that correlate the photosensitive elements to the material to be scanned, and the step of automatically adjusting the scanning of each row to compensate for random variations in shrinkage and expansion of document size comprises the step of automatically adjusting the definition of the scanning windows to enable the photosensitive elements to sense the material to be scanned at its actual location on the document.

8. In an optical scanning apparatus employing, in combination, a camera having a plurality of photosensitive elements defining pixels and means defining scanning windows correlating the photosensitive elements to material to be scanned, a method of detecting document skew and correcting for variations in document width comprising the steps of:
   (a) providing a document having rows of marking positions and a plurality of pairs of first and second guide marks, a first guide mark of each pair being associated with one end of each row and a second guide mark of each pair being associated with the other end of each row, each guide mark having a trailing edge;
   (b) scanning the document along scan lines and detecting the guide marks;
   (c) counting the number of scan lines along which scanning occurs after the first detection of a guide mark and comparing the count to a predetermined value;

(d) providing an indication that the document should not undergo continued scanning if, before the next detection of a guide mark, the value of the count exceeds the predetermined value;

(e) counting, along a scan line, the number of pixels between the trailing edges of a pair of guide marks to obtain a first measure of width, counting, along another scan line, the number of pixels between the trailing edges of the same pair of guide marks to obtain a second measure of width and comparing the first and second measures of width;

(f) performing a subsequent measure of width along a subsequent scan line between the same pair of guide marks if the first and second measures of width are not within one pixel value of each other and comparing the subsequent measure of width to a preceding measure of width; and, (g) providing an indication that the document should not undergo continued scanning if the subsequent measure of width and the preceding measure of width are not within one pixel value of each other, but otherwise correcting for width variations in the row, before performing further scanning, by automatically adjusting the definition of the scanning windows to correlate the photosensitive elements to the data indicating positions at their actual location on the document.

9. Method according to claim 8 wherein the marking positions are generally rectangularly shaped and have sides that are generally parallel to sides of the document, each marking position being of an integral number of printer's points, there being three pixels per printer's point, an integral number of pixels substantially completely and exactly corresponding to each marking position.

10. In an optical scanning apparatus employing, in combination, a camera having an array of photosensitive elements defining pixels, an addressable memory having stored data defining scanning windows of the camera as a function of pixel counts, an address counter clocked by a pixel pulse stream and supplying addresses to the memory, and a transport mechanism for transporting a document to be scanned by the camera, the document being of the type having rows of marking positions thereon and the scanning windows effectively correlating the phototosensitive elements to marking positions to be scanned, a method of detecting document skew and correcting for shrinkage and expansion of document width comprising the steps of:

(a) providing a generally rectangular document having (i) a plurality of rows of generally rectangularly shaped, preprinted marking positions for recording information by means of pencil marks and (ii) a plurality of pairs of first and second guide marks, each pair of guide marks being associated with a row, a first guide mark of each pair being adjacent to one end of each row and a corresponding second guide mark of each pair being adjacent to the other end of each row, each guide mark having a trailing edge, the marking positions and guide marks having sides that are generally parallel to sides of the document, each marking position, guide mark and spaces therebetween being of an integral number of printer's points, there being three pixels per printer's point, an integral number of pixels substantially completely and exactly corresponding to each marking position;

(b) scanning the document along scan lines and detecting guide marks and pencil marks, the scan lines extending between at least the trailing edges of each pair of guide marks, there being a plurality of scan lines between each pair of guide marks;

(c) counting the number of scan lines along which scanning occurs after the first detection of a guide mark in a pair of associated guide marks;

(d) providing an indication that the document should not undergo continued scanning if, before the detection of the other guide mark in the pair, the number of scan lines counted exceeds a predetermined scan line count, but otherwise proceeding to step (e);

(e) counting, along a scan line, the number of pixels between the trailing edges of a pair of guide marks to obtain a first tentative measure of width, counting, along another scan line, the number of pixels between the trailing edges of the same pair of guide marks to obtain a second tentative measure of width, comparing the first and second tentative measures of width, selecting the second measure if the two tentative measures are within one pixel of each other and proceeding to step (h), but otherwise proceeding to step (f);

(f) performing a subsequent tentative measure of width along a subsequent scan line between the same pair of guide marks, comparing the subsequent tentative measure of width to the preceding measure of width, selecting the subsequent measure if it is within one pixel of the preceding measure and proceeding to step (h), but otherwise proceeding to step (g);

(g) providing an indication that the document should not undergo continued scanning;

(h) periodically suppressing, according to the selected measure of width, a pulse in the pixel pulse stream to alter the address supplied to the memory, the scanning windows being initially defined as if the document were shrunk in width by a predetermined amount, the suppression of pulses from the pulse stream relocating the scanning windows to correspond to the selected measure of width of the document and effectively correlating the photosensitive elements of the camera with the actual locations of the marking positions while scanning for pencil marks in the marking positions associated with the pair of guide marks for pencil marks.

* * * * *